US012506735B2

(12) United States Patent
Ainsworth et al.

(10) Patent No.: US 12,506,735 B2
(45) Date of Patent: Dec. 23, 2025

(54) METHODS AND SYSTEM FOR EMPLOYEE MONITORING AND RULE AND QUORUM COMPLIANCE MONITORING

(71) Applicant: Tyco Fire & Security GmbH, Neuhausen am Rheinfall (CH)

(72) Inventors: Peter Alexander Ainsworth, Oxfordshire (GB); Ian C. Westmacott, Tewksbury, MA (US); Martin J. Donaghy, Antrim (GB); Derek Boyes, Armagh (GB); Terry Neill, Antrim (GB); John McKenna, Maghera (GB); Anne Gallagher, Belfast (GB); Mark Paterson, Newtownards Down (GB); Ashish Italiya, Newtownabbey (GB)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 16/756,908

(22) PCT Filed: Nov. 2, 2018

(86) PCT No.: PCT/US2018/058996
§ 371 (c)(1),
(2) Date: Apr. 17, 2020

(87) PCT Pub. No.: WO2019/090106
PCT Pub. Date: May 9, 2019

(65) Prior Publication Data
US 2021/0201269 A1    Jul. 1, 2021

Related U.S. Application Data

(60) Provisional application No. 62/581,207, filed on Nov. 3, 2017.

(51) Int. Cl.
*G07C 9/25* (2020.01)
*G06V 20/52* (2022.01)
(Continued)

(52) U.S. Cl.
CPC ............ *H04L 63/102* (2013.01); *G06V 20/52* (2022.01); *G07C 9/00904* (2013.01);
(Continued)

(58) Field of Classification Search
CPC .. G08B 13/19645; G07C 9/37; G06Q 50/265; G06Q 10/06; G06V 20/52
See application file for complete search history.

(56) References Cited

U.S. PATENT DOCUMENTS 4,777,478 A * 10/1988 Hirsch .................. G08B 19/00
340/521
6,904,168 B1    6/2005 Steinberg et al.
(Continued)

FOREIGN PATENT DOCUMENTS

CN        105516659 A      4/2016
DE    10 2009 000 006      7/2010
(Continued)

OTHER PUBLICATIONS

Miles, Christopher A. Cohn, Jeffrey P. Tracking Prisoners in Jail With Biometrics: An Experiment in a Navy Brig. National Institute of Justice. (Year: 2006).*
(Continued)

*Primary Examiner* — Johnna R Loftis
(74) *Attorney, Agent, or Firm* — ArentFox Schiff LLP

(57) ABSTRACT

Methods and system for employee monitoring and business rule and quorum compliance monitoring are disclosed. A proposed system includes one or more tracking systems for tracking movement of individuals in an enterprise, databases of business rules and operations schedules, and a business
(Continued)

rules validation system for determining whether compliance with the business rules based on the operations schedule and the movement of the individuals in the enterprise has been achieved.

22 Claims, 11 Drawing Sheets

(51) Int. Cl.

| | |
|---|---|
| *G07C 9/00* | (2020.01) |
| *G07C 9/30* | (2020.01) |
| *G07C 9/37* | (2020.01) |
| *H04L 9/40* | (2022.01) |
| *H04N 7/18* | (2006.01) |
| *H04W 4/029* | (2018.01) |

(52) U.S. Cl.
CPC .............. *G07C 9/257* (2020.01); *G07C 9/30* (2020.01); *G07C 9/37* (2020.01); *H04L 63/105* (2013.01); *H04N 7/181* (2013.01); *H04W 4/029* (2018.02)

(56) References Cited

U.S. PATENT DOCUMENTS

| | | | |
|---|---|---|---|
| 7,921,036 B1 | 4/2011 | Sharma et al. | |
| 8,219,438 B1 | 7/2012 | Moon et al. | |
| 9,711,034 B2* | 7/2017 | Daniel | G08B 21/22 |
| 9,996,736 B2 | 6/2018 | Smith et al. | |
| 10,109,171 B1 | 10/2018 | Mam et al. | |
| 10,121,070 B2 | 11/2018 | Derenne et al. | |
| 10,176,513 B1 | 1/2019 | Koka et al. | |
| 10,716,473 B2 | 7/2020 | Greiner | |
| 10,732,722 B1 | 8/2020 | Heraz | |
| 2002/0083025 A1 | 6/2002 | Robarts et al. | |
| 2003/0210139 A1* | 11/2003 | Brooks | G06Q 50/30 |
| | | | 340/531 |
| 2003/0217024 A1* | 11/2003 | Kocher | G06F 21/554 |
| | | | 706/47 |
| 2004/0210159 A1 | 10/2004 | Kibar | |
| 2004/0234108 A1 | 11/2004 | Li et al. | |
| 2005/0075116 A1 | 4/2005 | Laird et al. | |
| 2005/0091338 A1 | 4/2005 | de la Huerga | |
| 2005/0284200 A1 | 12/2005 | Moon et al. | |
| 2006/0024020 A1 | 2/2006 | Badawy | |
| 2006/0149589 A1* | 7/2006 | Wager | G16H 40/20 |
| | | | 705/2 |
| 2006/0190419 A1 | 8/2006 | Bunn et al. | |
| 2008/0033752 A1* | 2/2008 | Rodgers | G16Z 99/00 |
| | | | 705/2 |
| 2008/0091515 A1 | 4/2008 | Thieberger et al. | |
| 2009/0328152 A1* | 12/2009 | Thomas | H04L 63/102 |
| | | | 726/4 |
| 2010/0057592 A1 | 3/2010 | Moir | |
| 2010/0153146 A1* | 6/2010 | Angell | G06Q 40/08 |
| | | | 705/7.28 |
| 2010/0169134 A1 | 7/2010 | Cheng et al. | |
| 2010/0245536 A1 | 9/2010 | Huitema et al. | |
| 2011/0091847 A1 | 4/2011 | Carroll et al. | |
| 2011/0134240 A1* | 6/2011 | Anderson | G06V 20/52 |
| | | | 348/143 |
| 2011/0202595 A1 | 8/2011 | Kakiuchi | |
| 2012/0262296 A1 | 10/2012 | Bezar | |
| 2013/0012790 A1 | 1/2013 | Horseman | |
| 2013/0027561 A1 | 1/2013 | Lee et al. | |
| 2013/0101165 A1* | 4/2013 | Rexilius | G06V 40/10 |
| | | | 382/103 |
| 2013/0144914 A1* | 6/2013 | Libal | G06F 16/176 |
| | | | 707/784 |
| 2013/0155250 A1* | 6/2013 | Myers | H04N 7/181 |
| | | | 348/159 |
| 2013/0184592 A1 | 7/2013 | Venetianer et al. | |
| 2014/0018059 A1* | 1/2014 | Noonan | H04W 16/32 |
| | | | 455/419 |
| 2014/0130076 A1 | 5/2014 | Moore et al. | |
| 2014/0139678 A1 | 5/2014 | Moriarty et al. | |
| 2014/0207950 A1* | 7/2014 | Badiee | H04L 47/2425 |
| | | | 709/224 |
| 2014/0210617 A1* | 7/2014 | Markwitz | G06Q 10/06 |
| | | | 340/539.13 |
| 2014/0218164 A1 | 8/2014 | Mahapatra et al. | |
| 2014/0244264 A1 | 8/2014 | Thirumalainambi et al. | |
| 2014/0270383 A1* | 9/2014 | Pederson | G08G 1/04 |
| | | | 382/104 |
| 2014/0278629 A1 | 9/2014 | Stephenson et al. | |
| 2014/0307926 A1 | 10/2014 | Murakami et al. | |
| 2014/0339430 A1 | 11/2014 | Hillis et al. | |
| 2015/0028993 A1 | 1/2015 | Dyk et al. | |
| 2015/0193507 A1 | 7/2015 | Rappoport et al. | |
| 2015/0193718 A1 | 7/2015 | Shaburov et al. | |
| 2015/0278585 A1 | 10/2015 | Laksono et al. | |
| 2016/0078279 A1 | 3/2016 | Pitre et al. | |
| 2016/0104175 A1 | 4/2016 | Fanourgiakis et al. | |
| 2016/0110591 A1 | 4/2016 | Smith et al. | |
| 2016/0150124 A1 | 5/2016 | Panda et al. | |
| 2016/0170998 A1 | 6/2016 | Frank et al. | |
| 2016/0189149 A1 | 6/2016 | MacLaurin et al. | |
| 2016/0196728 A1 | 7/2016 | Suman et al. | |
| 2016/0203699 A1 | 7/2016 | Mulhern et al. | |
| 2016/0217345 A1 | 7/2016 | Appel et al. | |
| 2016/0267760 A1 | 9/2016 | Trani | |
| 2016/0302711 A1 | 10/2016 | Frank et al. | |
| 2016/0330217 A1 | 11/2016 | Gates | |
| 2016/0335870 A1 | 11/2016 | Yum | |
| 2016/0379046 A1 | 12/2016 | Crandall et al. | |
| 2016/0379145 A1 | 12/2016 | Valentino, III et al. | |
| 2017/0046496 A1 | 2/2017 | Johnstone et al. | |
| 2017/0046566 A1 | 2/2017 | Smith et al. | |
| 2017/0061202 A1 | 3/2017 | Shreve et al. | |
| 2017/0083757 A1 | 3/2017 | Enomoto et al. | |
| 2017/0148241 A1* | 5/2017 | Kerning | H04W 12/08 |
| 2017/0169284 A1 | 6/2017 | Chu et al. | |
| 2017/0192994 A1 | 7/2017 | Hong et al. | |
| 2017/0236029 A1 | 8/2017 | Howell | |
| 2017/0236397 A1* | 8/2017 | Myslenski | G08B 21/0453 |
| | | | 348/143 |
| 2017/0255880 A1 | 9/2017 | Daher et al. | |
| 2017/0280100 A1 | 9/2017 | Hodge | |
| 2017/0294063 A1* | 10/2017 | Hodge | G06K 9/00771 |
| 2017/0311863 A1 | 11/2017 | Matsunaga | |
| 2017/0351909 A1 | 12/2017 | Kaehler | |
| 2017/0357846 A1 | 12/2017 | Dey et al. | |
| 2018/0047230 A1 | 2/2018 | Nye | |
| 2018/0060157 A1 | 3/2018 | Packham et al. | |
| 2018/0069311 A1 | 3/2018 | Pallas | |
| 2018/0069975 A1 | 3/2018 | Honda et al. | |
| 2018/0114238 A1 | 4/2018 | Treiser | |
| 2018/0124242 A1 | 5/2018 | Zimmerman | |
| 2018/0154260 A1 | 6/2018 | Sawaki | |
| 2018/0184959 A1 | 7/2018 | Takahashi | |
| 2018/0300557 A1 | 10/2018 | Rodenas et al. | |
| 2018/0308130 A1 | 10/2018 | Hafeez et al. | |
| 2018/0336575 A1 | 11/2018 | Hwang et al. | |
| 2019/0005841 A1 | 1/2019 | Loi et al. | |
| 2019/0043207 A1 | 2/2019 | Carranza et al. | |
| 2019/0050955 A1* | 2/2019 | Beaudet | G01G 19/44 |
| 2019/0059725 A1* | 2/2019 | Greiner | G16H 50/20 |
| 2019/0080274 A1* | 3/2019 | Kovach | G06Q 10/0639 |
| 2019/0110727 A1 | 4/2019 | Egi et al. | |
| 2019/0122082 A1 | 4/2019 | Cuban et al. | |
| 2019/0147676 A1 | 5/2019 | Madzhunkov et al. | |
| 2019/0239795 A1 | 8/2019 | Kotake et al. | |
| 2020/0005416 A1 | 1/2020 | Wade | |
| 2020/0074156 A1 | 3/2020 | Janumpally et al. | |
| 2020/0082438 A1 | 3/2020 | Tunstall | |
| 2020/0125838 A1 | 4/2020 | Dalley, Jr. et al. | |
| 2020/0234523 A1* | 7/2020 | Ma | G08G 1/149 |
| 2020/0256113 A1 | 8/2020 | Salter et al. | |
| 2020/0302187 A1 | 9/2020 | Wang et al. | |
| 2020/0344238 A1 | 10/2020 | Ainsworth et al. | |
| 2021/0042527 A1 | 2/2021 | Ton-That | |

(56) References Cited

U.S. PATENT DOCUMENTS

| | | |
|---|---|---|
| 2021/0182542 A1 | 6/2021 | Lau |
| 2021/0185276 A1 | 6/2021 | Peters et al. |
| 2021/0196169 A1 | 7/2021 | Ainsworth et al. |
| 2021/0201269 A1 | 7/2021 | Ainsworth et al. |
| 2021/0202067 A1 | 7/2021 | Williams et al. |
| 2021/0248541 A1 | 8/2021 | Heier |
| 2021/0298157 A1 | 9/2021 | Olaleye et al. |
| 2021/0374391 A1 | 12/2021 | Jorasch et al. |
| 2022/0207915 A1 | 6/2022 | Voss |
| 2022/0329589 A1 | 10/2022 | Buscemi et al. |
| 2022/0382840 A1* | 12/2022 | Weston ............... G06V 40/30 |

FOREIGN PATENT DOCUMENTS

| | | |
|---|---|---|
| DE | 102016000091 A1 | 7/2017 |
| JP | 2017033244 A | 2/2017 |
| JP | 2017073107 A | 4/2017 |
| JP | 2018138155 A | 9/2018 |
| JP | 6752819 B2 | 9/2020 |
| WO | 2013166341 A1 | 11/2013 |
| WO | WO 2016128842 | 8/2016 |
| WO | 2018096294 A1 | 5/2018 |

OTHER PUBLICATIONS

Turner, Allan. Biometrics in Corrections: Current and Future Deployment. Corrections Today. (Year: 2003).*

E. Noma-Osaghae, O. Robert, C. Okereke, O. J. Okesola and K. Okokpujie, "Design and Implementation of an Iris Biometric Door Access Control System," 2017 International Conference on Computational Science and Computational Intelligence (CSCI), Las Vegas, NV, USA, 2017, pp. 590-593, 2017 (Year: 2017).*

K. Moseley and W. G. Sinclair, "Access control and monitoring in a prison environment," Proceedings IEEE 32nd Annual 1998 International Carnahan Conference on Security Technology (Cat. No. 98CH36209), Alexandria, VA, USA, 1998 (Year: 1998).*

International Search Report and Written Opinion of the International Searching Authority, mailed on Dec. 21, 2018, from International Application No. PCT/US2018/058971, filed on Nov. 2, 2018. 8 pages.

International Search Report and Written Opinion of the International Searching Authority, mailed on Jan. 4, 2019, from International Application No. PCT/US2018/058976, filed on Nov. 2, 2018. 13 pages.

International Search Report and Written Opinion of the International Searching Authority, mailed on Dec. 21, 2018, from International Application No. PCT/US2018/058984, filed on Nov. 2, 2018. 14 pages.

International Search Report and Written Opinion of the International Searching Authority, mailed on Dec. 21, 2018, from International Application No. PCT/US2018/058996, filed on Nov. 2, 2018. 14 pages.

Lutchyn, Y., et al. , "MoodTracker: Monitoring collective emotions in the workplace," 2015 International Conference on Affective Computing and Intelligent Interaction (ACII), 295-301 (2015).

Sidhu, R.S., et al., "Smart surveillance system for detecting interpersonal crime," International Conference on Communication and Signal Processing (ICCSP), 2003-2007 (2016).

International Preliminary Report on Patentability, mailed on May 14, 2020, from International Application No. PCT/US2018/058971, filed on Nov. 2, 2018. 7 pages.

International Preliminary Report on Patentability, mailed on May 14, 2020, from International Application No. PCT/US2018/058976, filed on Nov. 2, 2018. 8 pages.

International Preliminary Report on Patentability, mailed on May 14, 2020, from International Application No. PCT/US2018/058984, filed on Nov. 2, 2018. 9 pages.

International Preliminary Report on Patentability, mailed on May 14, 2020, from International Application No. PCT/US2018/058996, filed on Nov. 2, 2018. 9 pages.

S. Mora, V. Rivera-Pelayo and L. Muller, "Supporting mood awareness in collaborative settings," 7th International Conference on Collaborative Computing: Networking, Applications and Worksharing (CollaborateCom), 2011, pp. 268-277, doi: 10.4108/icst.collaboratecom.2011.247091. (Year: 2011).

M. Mumtaz and H. Habib, Evaluation of Activity Recognition Algorithms for Employee Performance Monitoring. Pakistan, 2012. (Year: 2012).

Turner, A., "Biometrics in Corrections: Current and Future Deployment," Corrections Today, 62-64 (2003).

Miles, A. C., et al., "Tracking Prisoners in Jail with Biometrics: An Experiment in a Navy Brig," NIJ Journal, 253: 1-4 (2006).

Gunes et al., "Emotion representation, analysis and synthesis in continuous space: A survey," 2011 IEEE International Conference on Automatic Face & Gesture Recognition (FG), 2011, pp. 827-834.

Anonymous, "Real-Time Optimization of Employee Productivity using Workplace Mood Analysis," IP.com Prior Art Database Technical Disclosure, Feb. 18, 2016, 5 pages.

Seddigh et al., "Does Personality Have a Different Impact on Self-Rated Distraction, Job Satisfaction, and Job Performance in Different Office Types?" PLoS One. May 25, 2016; 11 (5):e0155295.

* cited by examiner

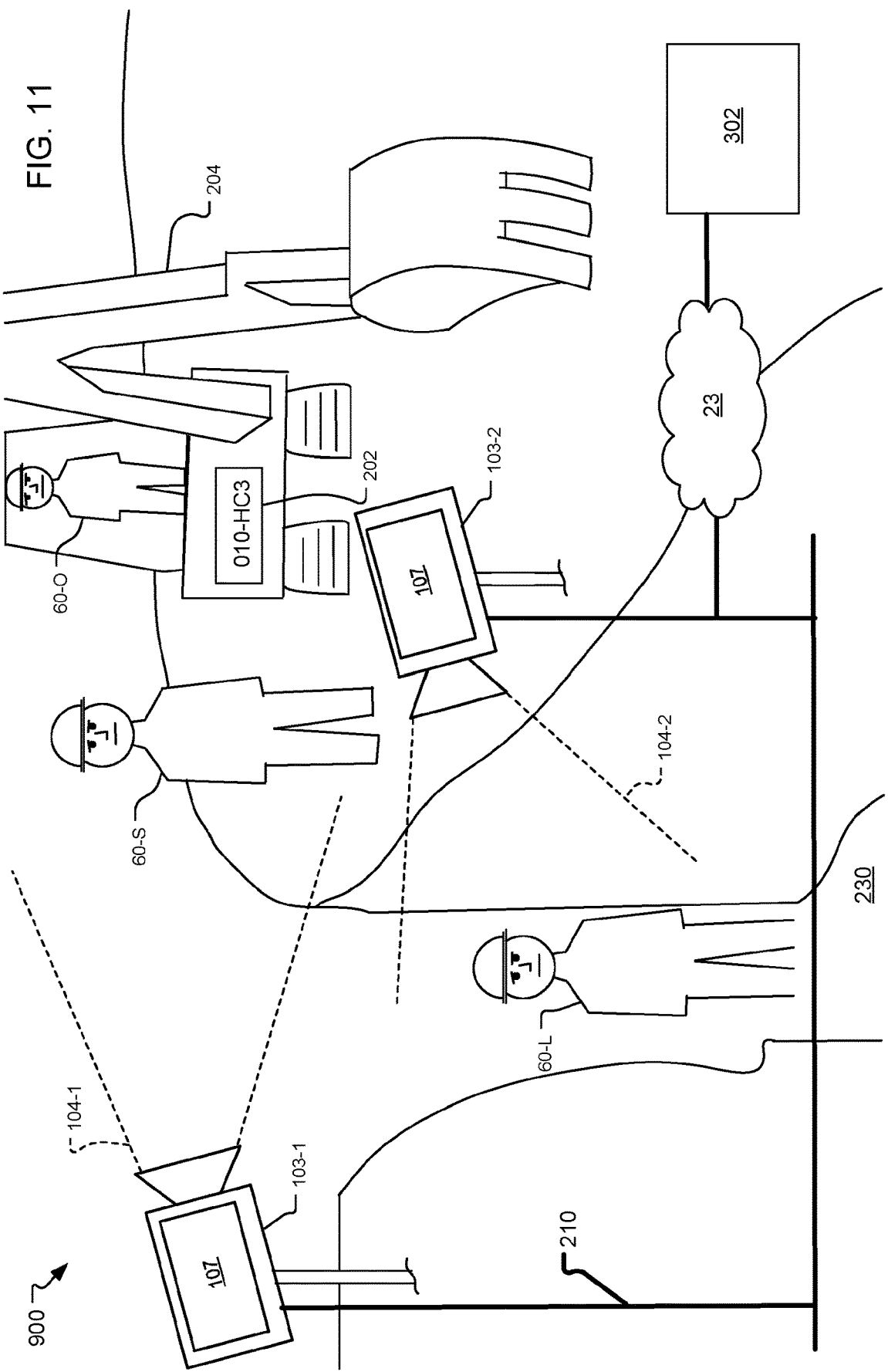

METHODS AND SYSTEM FOR EMPLOYEE MONITORING AND RULE AND QUORUM COMPLIANCE MONITORING

RELATED APPLICATIONS

This application is a § 371 National Phase Application of International Application No. PCT/US2018/058996, filed on Nov. 2, 2018, now International Publication No. WO 2019/090106, published on May 9, 2019, which International Application claims the benefit under 35 U.S.C. § 119 (e) of U.S. Provisional Application No. 62/581,207, filed on Nov. 3, 2017, both of which are incorporated herein by reference in their entirety.

BACKGROUND OF THE INVENTION

Enterprises, such as private and public companies, municipal, state and federal governmental agencies, and other entities, will often maintain a number of disparate systems to facilitate their operations, track their business relationships, and maintain security. Enterprise Resource Planning (ERP) systems are computer systems that allow enterprises to manage operations. Employee Resource Management (ERM) systems are typically different computer systems that allow the enterprises to track, schedule, and pay their employees. Access control systems are principally concerned with physical security and the selective access to, restriction of access to, and/or notification of access to the enterprises' buildings and secured parts of those buildings. Information technology (IT) security systems are principally concerned with control and restricting access to computer resources, often including access to any ERP or ERM systems, and possibly other systems such as file servers, etc. In addition, other security systems are often employed by the enterprises to round-out their security needs. A common example is a surveillance system.

The ERM systems store and manage many different types of information associated with employees. The ERM system might execute on a single computer system or server, or across multiple computer systems and servers, or be implemented in a cloud-based computer system. The different types of employee information controlled and managed by the ERM systems include biographic, including demographic, information, payroll and salary information, job performance and attendance information, benefits information, and training and compliance information, to list some common examples.

Modern ERM systems typically replace the functionality of multiple legacy systems that had separately managed and stored the different types of information associated with the employees. These legacy systems might have had separate payroll systems for the payroll and salary information, human resources systems for the biographic, job performance and attendance information, benefits systems for the benefits information, and learning systems for the training and compliance information, in examples. At the same time, the ERM system can simply be a collection of local or remote databases that store the different types of information associated with each employee.

ERP systems generally track business resources and manage operations. Business resources include such as cash, raw materials, and production capacity. The ERP systems can track business commitments such as orders, purchase orders, and possibly might overlap with the ERM systems. In terms of operations, the ERP systems include schedules for performing various tasks and also possibly business rules for performing those tasks.

As such, these ERP systems are computer systems that often include computer databases and database management systems for the databases, along with different user interfaces. The different user interfaces allow the operators to obtain information from the systems and submit information to them. The ERP systems typically further include various computer systems connected with manufacturing and the control and management of other operations of the enterprises.

The access control systems typically include access control readers. These readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read user information of the keycards, such as credentials of the individuals, and then the access control systems determine if the individuals are authorized to access the restricted areas. If the individuals are authorized to enter the restricted areas, then the access control readers allow access to the restricted areas by unlocking locked doors, signaling that doors should be unlocked, or generating alarms upon unauthorized entry, for example.

More recently, frictionless access control systems are being proposed and designed. These systems typically rely on individuals carrying beacon devices that can broadcast credentials, such as dedicated fob devices or personal mobile computing devices such as tablet or smart phone computing devices. These systems are "frictionless" in that the individual may not have made any overt gesture indicating a desire to access the restricted area, e.g., the individuals did not swipe a keycard. The access control systems will then monitor and track the individuals as they move through the buildings and automatically open access points such as doors when approached, assuming that the individuals are authorized to pass through those access points.

Enterprise surveillance systems are used to help protect people, property, and reduce crime. These systems are used to monitor buildings, lobbies, entries/exits, and secure areas within the buildings of the enterprises, to list a few examples. The surveillance systems record illegal activity such as theft or trespassing, in examples. At the same time, these surveillance systems can also have business uses. They can track employee locations across different rooms within buildings and among the different buildings of the enterprises.

In these surveillance systems, surveillance cameras capture image data of scenes. The image data is typically represented as two-dimensional arrays of pixels. The cameras include the image data within streams, and users of the system such as security personnel view the streams on display devices such as video monitors. The image data is also typically stored to a video management system (VMS) for later access and analysis.

Increasingly, it is being proposed to make these VMSs smarter. For example, VMSs with image analytics systems are becoming more prevalent. These analytics systems allow the VMSs to interpret the captured image data and possibly send alerts when detecting trespassing or other problems. One common type of image analytics is facial recognition. In such instances, modules of the VMS will identify faces within the image data and compare those faces to databases to try to identify the different individuals captured in the image data.

SUMMARY OF THE INVENTION

The proposed system can operate across a number of the existing systems, which are often present in most enterprises in one form or another. In one of its most useful configurations, the proposed system combines operations information and business rules, such as might be stored in an ERP system, or similar computer system that holds the operations and business rules information, with information from tracking systems such as surveillance and/or access control systems. And, the proposed system functions to validate or not validate compliance with those business rules of the enterprise.

In one instantiation, the proposed system recognizes that certain business activities and situations require a quorum of people to be present before certain events can happen. The system uses image analytics such as facial recognition information obtained from surveillance cameras to determine whether the quorum requirements are met for each the business activities.

The proposed system could further recognize whether the correct people are present for certain business activities and situations. For example, if a manager is required to be present for certain times, or for certain activities, the present system can compare the presence of the manager, or absence, to the business rules governing their presence.

The system can further take actions based on the compliance (or non-compliance) with the business rules. For example, the system could store information concerning compliance with the rules back to the ERP or similar system. In another example, the system could signal an access control system to take some action, such as to lock doors. Guards stations or managers could also be signaled or otherwise notified.

In general, according to one aspect, the invention features a system for business rules compliance monitoring. The system comprises one or more tracking systems for tracking movement of individuals in an enterprise, databases of business rules and operations schedules, and a business rules validation system for determining whether compliance with the business rules based on the operations schedule and the movement of the individuals in the enterprise has been achieved.

The tracking systems may include an access control system for controlling access of individuals through access points within the enterprise and/or a surveillance system including surveillance cameras and a facial recognition system for performing facial recognition of individuals in the image data from the surveillance cameras.

Often, the system connects to an enterprise resource planning system containing the business rules and operations schedules databases.

The system may also connect to an employee resource management system that maintains an employee database, wherein the business rules validation system accesses the employee resource management system to obtain employee job descriptions, for example.

In one example, the business rules govern a ratio of employees to supervisors, and the business rules validation system determines compliance with the ratio based on the tracked movement of the individuals within the enterprise.

In another example, the business rules govern a number of employees to non-employees, and the business rules validation system determines compliance with the ratio based on the tracked movement of the individuals within the enterprise. Such an example arises at a prison, in which case the non-employees are prisoners.

In another example, the business rules govern a number of employees that must be present for specified operations, and the business rules validation system determines compliance with the rules concerning the number of employees based on the tracked movement of the individuals within the enterprise.

In general, according to one aspect, the invention features a method for business rules compliance monitoring. The method comprises tracking movement of individuals in an enterprise, accessing of business rules and operations schedules stored in an enterprise resource planning system, and assessing compliance with the business rules based on the operations schedule and the movement of the individuals in the enterprise.

One issue that arises in access control systems is the problem of tailgating. This occurs when an individual that is not authorized to pass through an access point nevertheless passes through the access point in close physical proximity to an individual that is authorized to pass through the access point. Thus, the unauthorized person is able to access the premises without having to present valid user information.

A proposed system infers tailgating of users at an access point, based upon facial recognition information of the users obtained from image data captured by surveillance cameras at the access point.

Current intelligent guard tour solutions use motion detection in order to control the automatic movement of PTZ cameras and focus the cameras on areas where there is high motion. This highlights issues when they occur. However, this will not alert security personnel to anomalies detected in the areas. Anomalies include crowds of people gathering in an area who may potentially cause trouble, or one or more individuals in an area at unexpected times of day, in examples.

Another proposed system, or another aspect of the previously mentioned system, controls a guard tour of a camera based upon how individuals are gathered and/or facial recognition of individuals obtained by the cameras.

Another proposed system, or another aspect of a previously mentioned system, determines whether individuals are authorized to deliver goods to a building based upon the facial recognition information of the individuals. The system analyzes facial recognition information of individuals that are operators of vehicles which provide the goods, and/or analyzes license plate information of the vehicles. The system determines whether the individuals can access the building based on this information.

Another proposed system, or another aspect of a previously mentioned system, controls temperature within a building based upon a face count of individuals in the building. Cameras of the system are mounted within rooms of the building that obtain the face count from image data. Based on the face count in each room, a control system sends signals to thermostats in the rooms to adjust the temperature in the rooms.

Another proposed system, or another aspect of a previously mentioned system, determines whether individuals are unexpectedly running within a building, which may suggest an emergency situation at the building. For this purpose, one or more cameras track and obtain facial recognition information of the individuals.

Another proposed system uses facial recognition information and location information of individuals obtained from cameras at a building. Based on information sent from one or more cameras, the system determines that individuals are running within the building, such as part of an emergency situation at the building.

Another proposed system, or another aspect of a previously mentioned system, uses facial recognition information obtained from cameras at a construction jobsite to monitor working conditions at the jobsite, such as to monitor conditions of lone workers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 11 shows surveillance cameras of a safe city system that are monitoring a construction site, where a lone worker and a supervisor watching over the worker are also shown.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
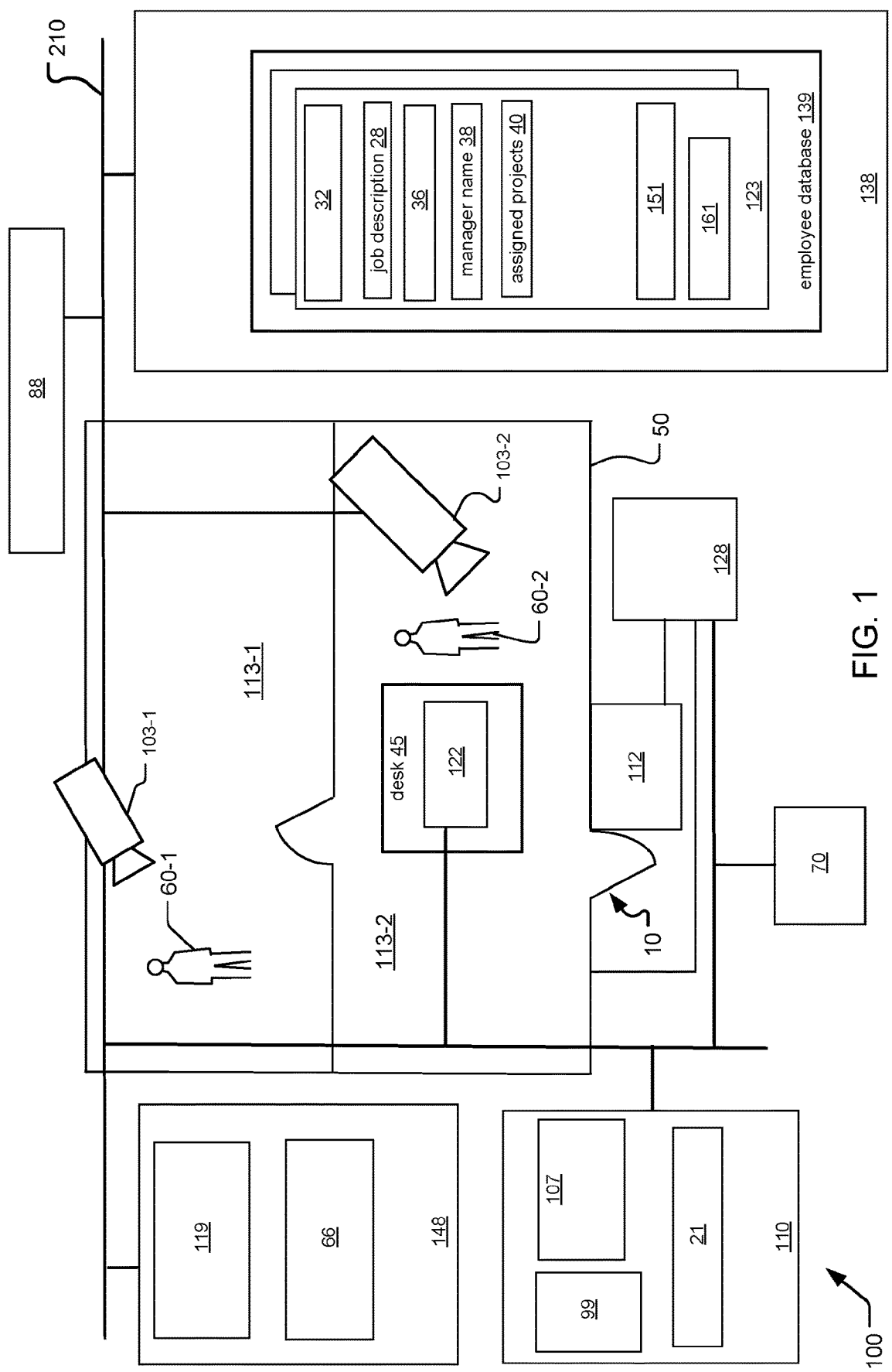
FIG. 1 is a schematic diagram showing rooms of a building and an enterprise business rule monitoring system installed at the building, in accordance with principles of the present invention.

FIG. 1 shows an enterprise business rule monitoring system 100 deployed at a building 50 of a retail establishment or office building or manufacturing facility or governmental facility such as a prison.

The figure shows client computer systems 122 at a building 50 of the enterprise. Some of these client computer systems might be public terminals in conference rooms that might be used by different individuals over the course of the day. In other examples, the client computer systems 122 are dedicated computer systems assigned to a specific employees of the enterprise.

Also shown are other computer systems that are associated with the operations of the enterprise, such a surveillance system, an ERM system 138, an access control system (ACS) 128, an operator console 70, and an ERP system 148, which communicate over a local network 20. Finally, a business rules validation system 88 provides some of the important functions of the present invention.

In more detail, the cameras 103 of the surveillance system capture image data 99 of the rooms 113 through the enterprise's building and thus images of individuals 60 in each room 113. Cameras 103-1 and 103-2 are respectively installed in rooms 113-1 and 113-2.

The surveillance system's VMS 110 stores the image data 99 from the cameras 103 and typically includes a camera locations table 21 and a facial recognition module 107. The camera locations table 21 typically has a record for each of the surveillance cameras 103. The record contains such information as the room 113 in which the camera 103 is installed. It may also include information concerning the type of camera and possibly even the field of view of the camera with respect to a map or floor layout of the building 50. The facial recognition module 107 determines facial recognition information of the individuals captured in the image data and monitors movement and/or activity of individuals 60 within the rooms 113 and in this way functions as a tracking system.

The surveillance system, and particularly the VMS 110 in one embodiment, produces a surveillance meta data stream. This metadata stream includes the individuals that have been identified in the image data from the surveillance cameras by the facial recognition module 107. The metadata stream also includes the location where those individuals were identified within the building. Typically, this is performed by looking up the location of the surveillance camera 103 that collected the image in the camera locations table 21.

The ERM system 138 is preferably as described hereinabove. As such, it has an employee database 139 that stores employee records 123 of employees 60. The employee records 123 include information for identifying each employee and locations of desks 45 within the building 50 for the employees. In more detail, each employee record 123 typically includes a name 24, an employee number 32, a badge number 34, a badge photo 36, an authorization level 151, and one or more desk locations 161. The desk locations 161 list the locations of desks that each employee is authorized to be present at or is otherwise expected to be near during work hours. In addition, the ERM system 138 may also include other information such as databases that store the same information for contractors and visitors to the enterprise.

In other applications, the ERM system 138 may contain additional information beyond information strictly only for employees. For example, if the system is the deployed in a prison, the ERM system or similar system may also include the same information but for prisoners that are being housed at the prison. Specifically, the ERM system 138 with thus include a prisoner record for each prisoner including their name, prisoner number, photo, biographic and physical information, for example.

The access control system 128 controls physical access through access points 10 of the building 50 and thus also functions as a tracking system. In the illustrated example, the access points are doors, but may also include hallways or elevators or floors within the buildings of the enterprise. Typically, the access control system 128 further includes card readers for reading employee badges and/or frictionless readers that might validate employees based on credentials provided by a mobile computing device such as a smart phone. In this way, the access control system is able to monitor movement of individuals through access points.

The access control system 128 generates an access control metadata stream. This stream includes the individuals, such as employees, that were seeking access through the access points such as by interacting with the card readers. It further includes the particular access point that they were seeking access through. Further, it includes the time and the location of that access point.

The ERP system 148 preferably functions as described hereinabove. As such, the computer system on which the ERP system executes maintains databases. Of particular relevance here are a business rules database 119 and an operations schedule database 66.

The business rules database 119, as its name implies, maintains business rules for various underlying activities and processes occurring within the enterprise. In one example, the business rules database 119 would include business rules for manufacturing processes, the steps involved for or associated with those manufacturing processes, and the personnel that execute the processes along with possibly work instructions for those personnel.

The operations schedule database 66, as its name implies, includes operations schedules for possibly each of the various activities and processes scheduled to be performed by the enterprise. The operations schedules specify when the manufacturing or other operations processes, for example, are scheduled to take place. The operations schedules might further dictate times for meetings between employees and/or nonemployees such as prisoners, according to another use case. The operations schedules could further dictate the times when prisoners are to be moved, in another example.

In the case of a retail establishment, for example, the business rules database 119 would include one or more business rules for an inventory locations process. Such a process defines where different goods would be stocked on the shelves within the establishment's store. The associated business rule, when executed by the business rules validation system 88, would confirm (i.e. validate) that the inventory locations process was carried out. The operations schedule for the same process dictates the timing of when the inventories (i.e. the inventory processes) are scheduled to take place, the employees that take the inventories, and the details of how the shelves are restocked based on the inventories that were taken by the employees, in examples.

The business rules validation system 88 performs a number of important functions of the present system. Generally, it draws on information from the ERM system 138, and the ERP system 148. It also draws on the surveillance metadata stream from the surveillance system and the access control metadata stream from the access control system 128.

Generally, the business rules validation system 88 determines whether compliance with the business rules based on the operations schedule and the movement of the individuals in the enterprise has been achieved.

In the illustrated embodiment, these business rules are stored in the business rules database 119 of the ERP system 148. When compliance with the business rules requires information concerning the employees that are performing the business rules, then the business rules validation system 88 accesses the employee records 123 of the employee database 139 of the ERM system 138.

In the illustrated example, multiple individuals 60 are located within and/or are moving about the rooms 113.

Individual 60-1 is located in room1 113-1 and individual 60-2 is located in room2 113-2. Individual 60-2 is also located near the desk 45.

The ACS 128 and the VMS 110 each provide respective meta data streams to the business rules validation system 88. In the case of the ACS 128, it provides a stream of access requests. The VMS 110 provides the facial recognition information for the identified individuals in its meta data stream.

Using the identified/tracked individuals in the meta data stream sent from the VMS 110, the business rules validation system 88 obtains the associated employee records 123 for the individuals 60. The employee records 123 also importantly include roles of the individuals within the enterprise, such as a manager, sale associate, stocking clerk, etc.

Figure 2:
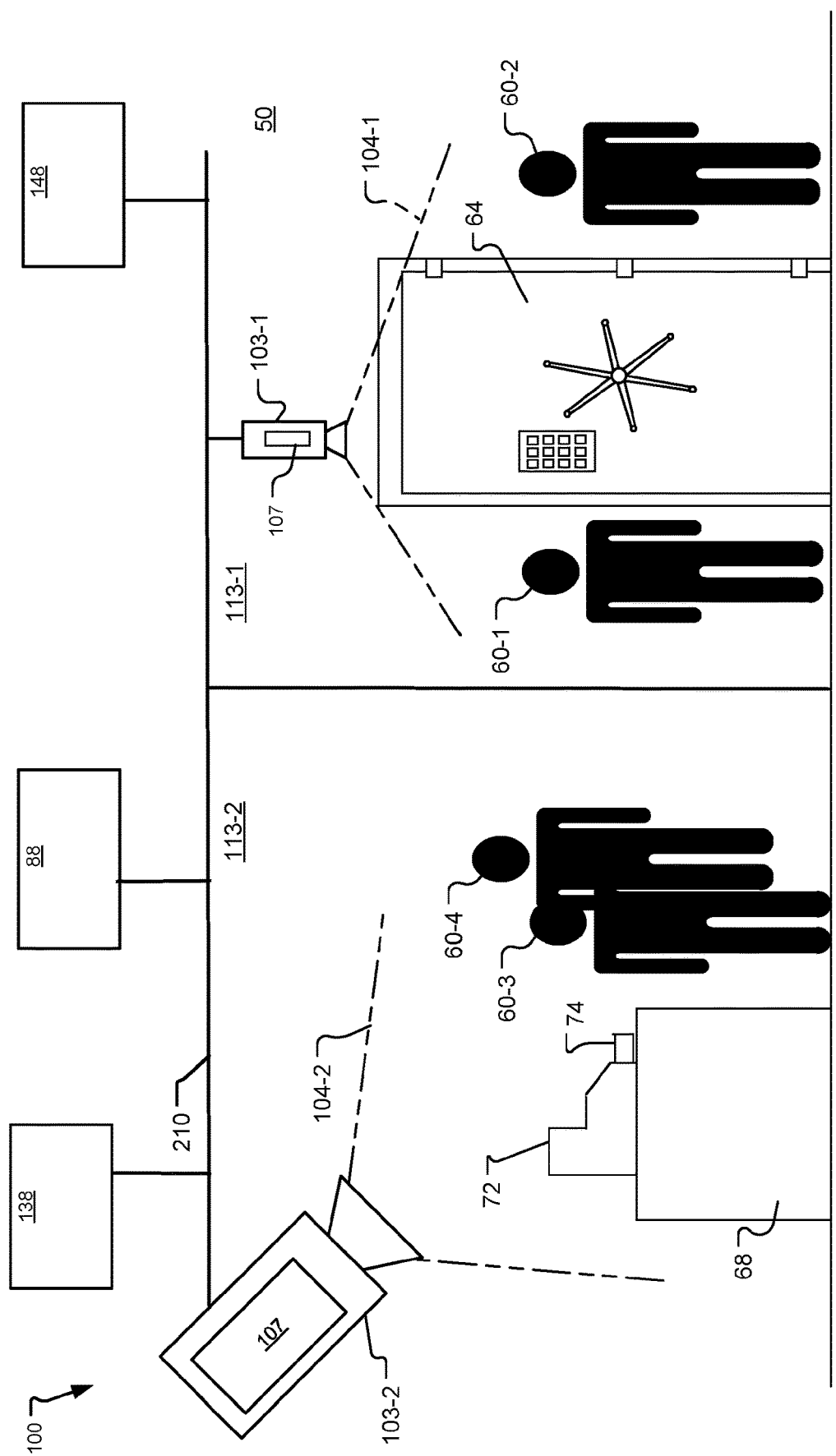
FIG. 2 is a schematic diagram showing rooms of a building to illustrate use cases for the enterprise business rule monitoring system.

FIG. 2 illustrates some use cases of the business rules validation system 88.

Two rooms 113-1 and 113-2 within the building are also shown. Each room includes a camera 103, and each camera 103 includes a facial recognition module 107 that augments or replaces such a system in the VMS 110.

Many processes and situations require a quorum of people to be present before certain events can happen. In prisons, for example, a certain number of prison officers must be present for a given number of prisoners. In hospital and business settings, health and safety rules state that there must always be at least two people in a building. In laboratories, dealing with dangerous chemicals may require that someone with fire training or first aid training is present. As described earlier, these business rules are stored in the business rules database 119.

Some business processes also require a certain number of individuals to be present, and these individuals need to have certain qualifications. For example, server rooms that include data computing servers may require that, when the server room is entered, there must be at least two people. To ensure that the requirements of this process are met, a security operator would define a business rule with the requirements, and the business rules validation system 88 would execute the rule against the underlying process to determine whether the rule has been met.

Security operators can also define actions in the business rules, where the actions are carried out when then the business rules are (or are not) met. For example, an owner may wish to be alerted whenever dangerous situations occur, or they wish to prevent processes or equipment from functioning if certain criteria are not met.

Yet other types of business rules are possible. In examples, the rules might specify something like "there must be at least two people in the server room at any time"; "this process requires a senior manager to be present to supervise"; "if there are ten people present in this location, then there must be at least 3 prison officers"; and "a qualified fire marshal must be standing beside a fire extinguisher before this process can be allowed to start".

The facial recognition module 107 analyzes image data of the scene captured by the camera 103 and obtains facial recognition information of the users from the image data to determine if the activity and/or business process has been met (or violated). The recognition module 107 also recognizes and identifies faces, counts faces, and generates spatial information about faces (e.g. where they are located in the image data).

In the illustrated example, both individuals 60-1 and 60-2 are required to be present in room 113-1 when opening a safe 64. The security system 100 can compare facial recognition information obtained of the users 60-1 and 60-2 to that of authorized users for this activity.

In room 113-2, in another example, retail employees 60-3 and 60-4 are present at a table 68 with a cash register 72. When opening the cash register door 74 to count money at the end of each day, a rule might require that at least two persons 60 be present.

The employee database 139 includes details about people's names and job functions. The operations schedule database 66 identifies/includes lists of processes/activities to be performed in a particular location at a particular time (for example, "maintenance will be performed in the server room between 2 pm and 4 pm"). The operator console 70 can provide alerts to interested parties whenever a rule fails.

Figure 3:
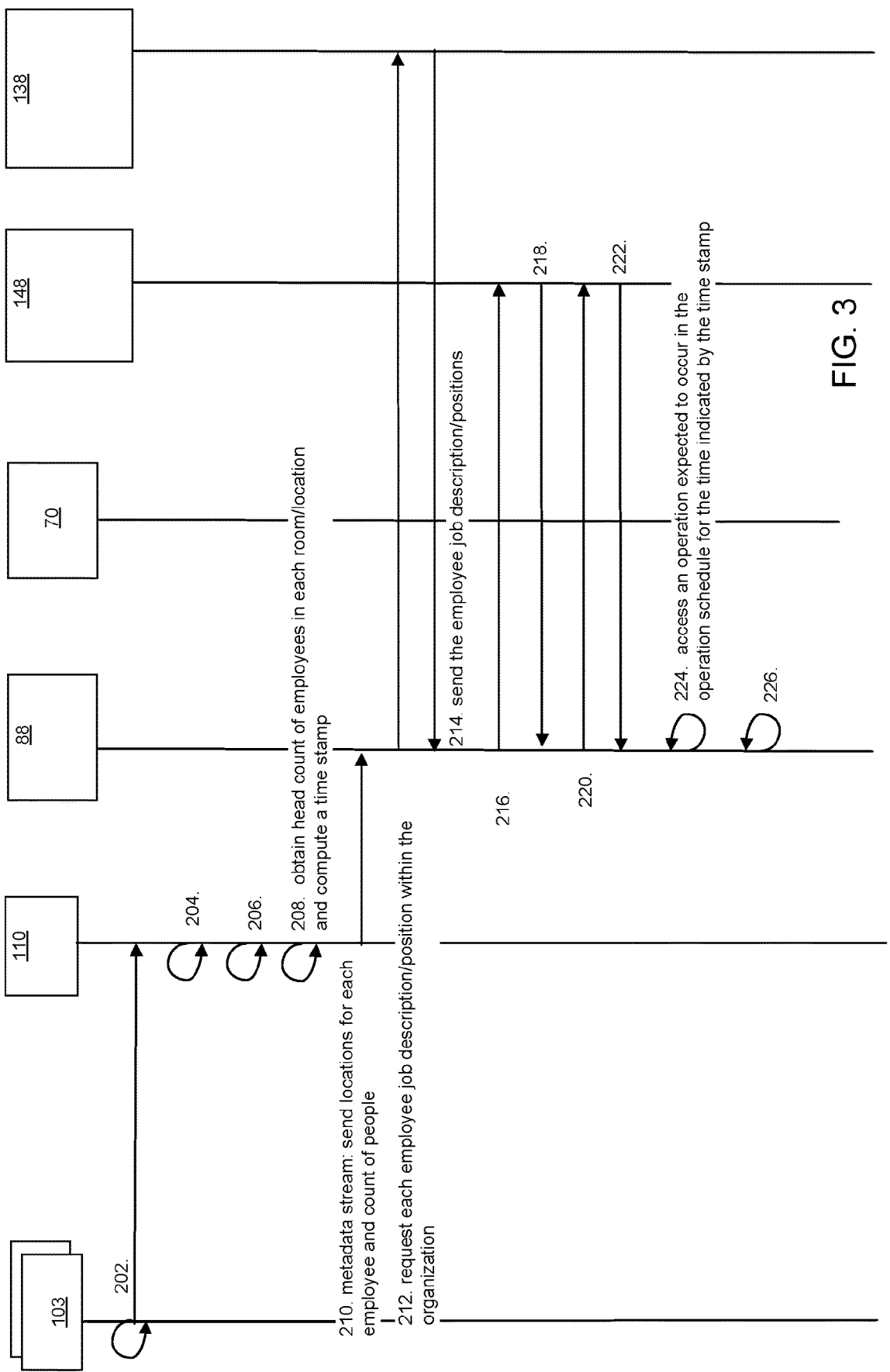
FIG. 3 is a sequence diagram that illustrates one method of operation for the enterprise business rule monitoring system in which it draws on tracking information from a tracking system such as a surveillance system, and from additional information resources including an enterprise resource planning (ERP) system and an employee resource management (ERM) system.

FIG. 3 shows a sequence diagram illustrating the operation of the system for business rules compliance.

As discussed previously, cameras 103 are located around the building of the enterprise. Those cameras capture and send image data to the VMS 110 in step 202.

In one implementation, the VMS includes the facial recognition module 107. But note, this facial recognition module could instead be present on the surveillance cameras 103, for example. In other cases it could be on a special dedicated image analytics system.

The operation of the facial recognition module 107 enables the identification of the individuals in the image data, in step 204. In some embodiments, the facial recognition module may access employee badge photos 36 that are stored in the employee records 123 of the employee database. In other examples, the facial recognition module 107 may access stored facial signatures that have been associated with different employees or different individuals at the enterprise. In a human specific example, these individuals could be prisoners that are housed at a prison.

The VMS is also able to determine the location of those identified individuals and other individuals in captured in the image data and indicated by the image analytics. This information is stored in the camera locations table 21 and performed in step 206. The location can include a room number, or location of entry and/or exit door The image analytics operations of the VMS 110 can further perform additional processing of the image data. For example, in step 208 it generates a headcount of the employees or other individuals in each room of the building.

On a continuous basis, as indicated in step 210, the VMS 110 provides the surveillance metadata stream to the business rules validation system 88.

Also, while not shown in this figure, in other embodiments, the access control system 128 provides the access control metadata stream to the business rules validation system 88.

The business rules validation system 88 will typically determine the roles, such as management roles of the persons identified in the metadata streams. This information is typically stored in the ERM system 138 and accessed in steps 212 and 214.

The business rules validation system 88 also accesses the business rules. In the illustrated embodiment, these business rules are stored in the business rules table 60 of the ERP system 148. These business rules are requested in step 216 and received by the business rules validation system in step 218.

Additionally, in many embodiments, the business rules validation system 88 also requests the operations schedule. The operations schedule provides information as to when certain activities are scheduled to take place. The schedule is requested in step 220 and received by the business rules validation system 88 in step 222.

Then, in step 224 the business rules validation system 88 determines whether or not the scheduled operations are being performed in accordance with the business rules based on the metadata streams from the surveillance system and possibly the access control system. In step 226, it determines whether or not there is compliance with those business rules.

Figure 4:
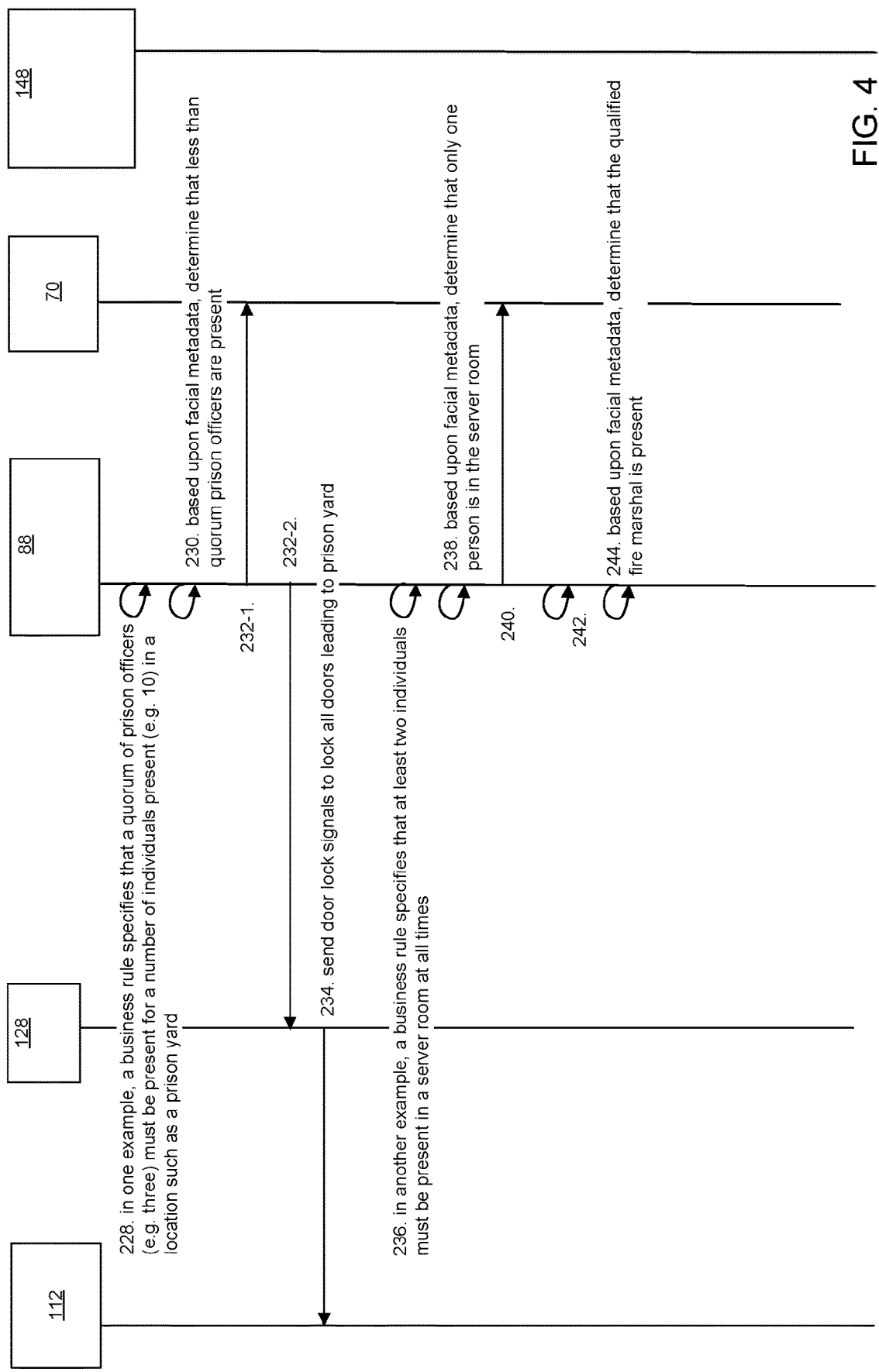
FIG. 4 is a sequence diagram that illustrates use cases for the enterprise business rule monitoring system, such as in a prison or a server room.

FIG. 4 illustrates some use cases.

In step 228, the business rules validation system 88 in one example accesses the business rules associated with the number of prison officers that must be present based on the number of prisoners that are present.

In step 230, the business rules validation system 88 is able to determine whether there is an adequate or insufficient number of prison officers present. Generally, this analysis would be based upon the business rules that dictate the prisoner to officer ratio, and the access control metadata stream and/or the surveillance metadata stream.

In the instance when there would be an insufficient number of prisoners, the business rules validation system can take certain actions. In the illustrated example, an alert message is sent in step 232-1 to an operator console 70. Additionally, control messages are sent from the business rules validation system 88 to the access control system 128. Such control messages could be an instruction to lock the doors to or from the prison yard. This is indicated in step 234.

The example of access to a server room is illustrated in steps 236-240. In this case, the business rules validation system 88 would analyze the metadata stream from the surveillance system and/or the access control system concerning the number of individuals that have entered a server room in steps 236 and 238. Possibly based on the metadata stream from the surveillance system, the business rules validation system 88 could also determine the employment status of those individuals and confirm that they are employees who have been given and have authorized access to that server room. In the case of violation of the rules, alert messages could be sent to the operator console 70 in step 240.

Step 242 and step 244 illustrate the operation of the business rules validation system 88 to validate business rules associated with the transfer of hazardous materials and/or the presence of a manager.

For example, in step 242, the business rules would specify that a fire marshal would need to be standing near a fire extinguisher when there is a transfer of flammable liquids in a room. Possibly the time at which the transfer of flammable liquids is set forth in an operations schedule within the operations schedule database 66 of the ERP system.

In a related instance, possibly the business rules would specify the presence of a manager such as at a store during its hours of operation to supervise the cashiers.

The number of people and types of supervisors that need to be present would be specified in the business rules.

In step 244, the business rules validation system confirms whether or not the business rules have been met or violated. In the present example, the business rule in step 242 requires that a qualified fire marshal be present. As before, this validation would be based upon the metadata streams from both the surveillance system and the access control system.

Figure 5:
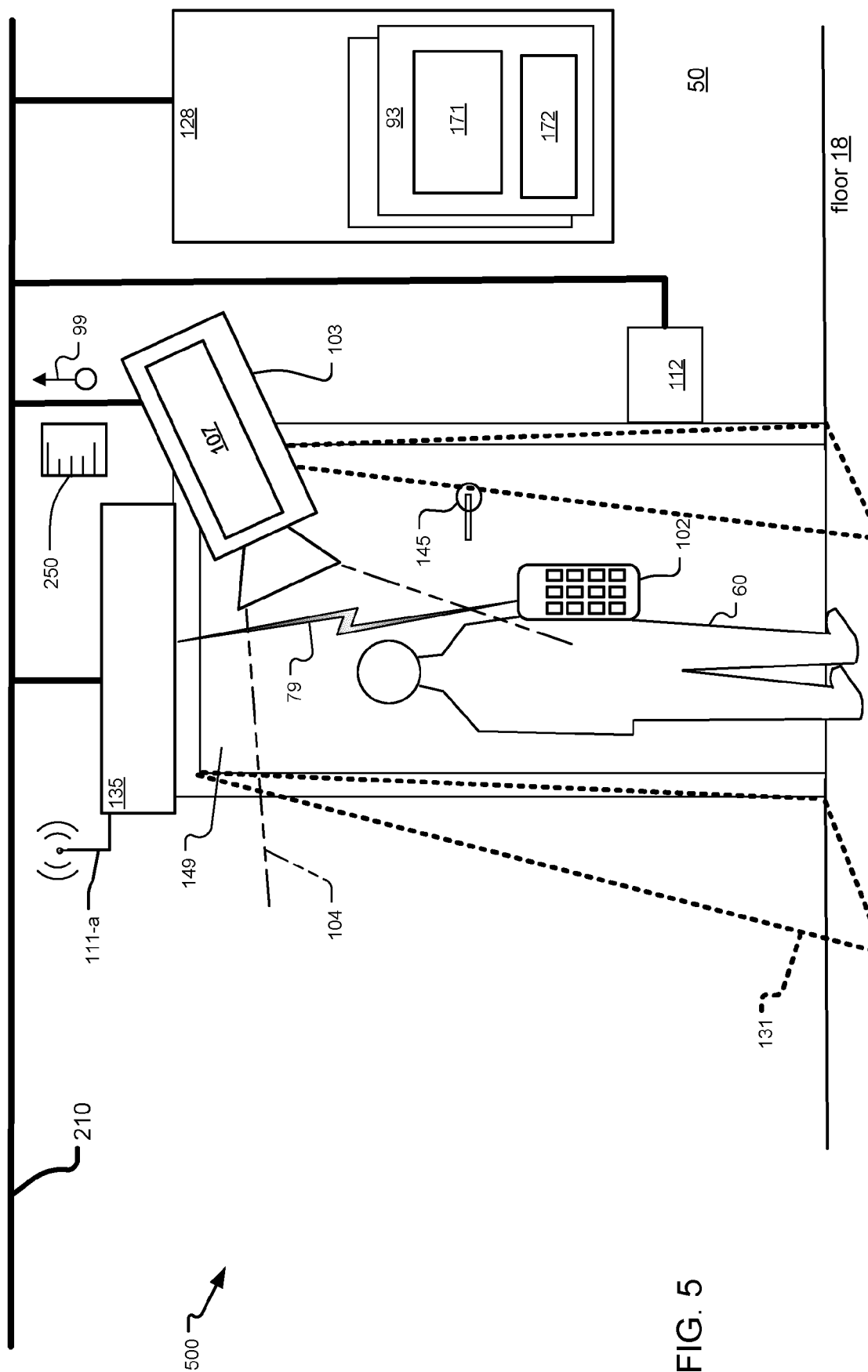
FIG. 5 is a schematic diagram of a security system at a building, where an access control system of the security system authorizes users near an access point of the access control system, via a dual authentication mechanism based upon facial recognition information obtained of the users, and upon user credentials of the users sent by user devices carried by the users.

FIG. 5 shows an exemplary security system 500 at a building 50. The system 500 includes a surveillance camera 103, an access control system (verification and tracking system) 128, and a door controller 112. These components communicate over a local network 210. The access control system 128 identifies individuals/users 60, tracks locations of the users, and monitors access to restricted or different areas of the building 50, for example, through access points such as doors 149.

In this example, the video management system could be located within the access control system (ACS) 128.

The facial recognition operations that were performed within the VMS of FIG. 1-4 are instead performed within the cameras. The cameras send streams of meta data that include the facial recognition information to the access control system 128 for analysis.

The ACS 128 also maintains caches of both the user credentials and the facial recognition information, and stores these caches to user accounts 93 at the ACS for each of the individuals.

Users 60 carry user devices 102 that include credentials of the users. The access control system attempts to authorize the users when the user devices 102 (and therefore the users 60 carrying the user devices) are in a threshold area 131 of the access point 149. Examples of user devices 102 include smart phones, fobs, tablet devices, or any commodity computing device running the Android or IOS operating systems, in examples.

The camera 103 includes a facial recognition module 107. The access control system 128 includes user accounts 93 of users 60. Each user account 93 includes user credentials 172 of authorized users and facial recognition information 171 of authorized users (e.g. biometric facial pattern).

The camera 103 captures image data 99 of a scene within a field of view 104 of the camera 103. The camera 103 also determines facial metadata 250 from the image data 99. The metadata 150 includes facial recognition information such as a biometric facial pattern of the user, in one example. The cameras 103 send the metadata 250 over the local network 210 to the access control system 128.

The access control system includes a positioning unit 135 that is typically installed in room or other locations in the building 50. In the illustrated example, it is installed in connection with the door access point 149. The positioning unit 110, in one implementation, includes one or more antennas 111 that enable the positioning unit 135 to determine locations of the user devices 102 relative to the access point 149.

The user devices 102 send the credentials in wireless messages 79 to the positioning unit 135. In one example, the messages are sent using Bluetooth Low Energy (BLE) signals. The positioning unit forwards the credentials to the access control system 128, which then compares the credentials to that of authorized users.

In the illustrated example, users 60 enters a threshold area 131 near the access point 149 to obtain access. When the users 60 are near or within the threshold area 131, the users 60 are within the field of view 104 and are thus the face of the user 60 is captured within the image data 99.

Once the access control system 128 confirms that the user credentials match that of an authorized user, the access control system 128 extracts and analyzes the contents of the metadata 250 to determine whether the facial recognition information matches that of the user associated with the matched user credentials. Only then does the access control system 128 authorize the user 60.

When users 60 are authorized by the access control system 128, the access control system 128 sends a signal over the local network 210 to the door controller 112. The signal unlocks the door 149, and the users turn door handle 145 of the door 139 to obtain access to the restricted areas.

As a result, user credentials sent in wireless messages by user devices 102, and facial recognition information of the users, are respectively a first and second authentication level that are required for users to obtain access to the access control system 128.

Figure 6:
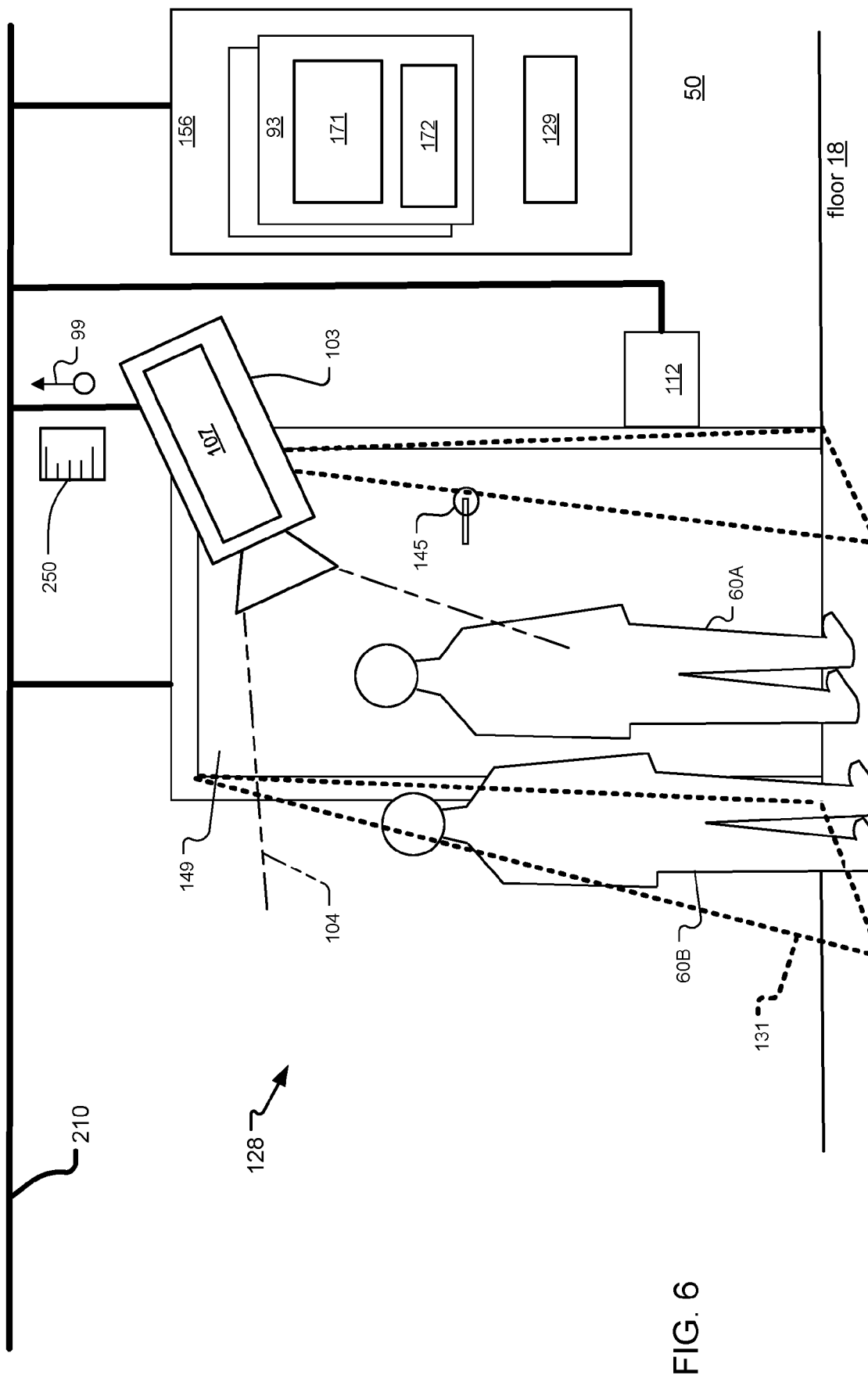
FIG. 6 is a schematic diagram showing an access control system at a building, where the system detects, tracks and authorizes users near an access point of the access control system based upon facial recognition information of the users, and where the diagram also illustrates a non-authorized user attempting to "tailgate" or pass through the access point with an authorized user.

FIG. 6 shows an exemplary access control system 128 at a building 50. The access control system 128 includes a surveillance camera 103, a verification and tracking system 156, and a door controller 112. These components communicate over a local network 210. The access control system 128 identifies individuals/users 60, tracks locations of the users, and monitors access to restricted or different areas of the building 50, for example, through access points such as the doors 149.

In this example, the video management system could be located within the verification and tracking system 156.

The facial recognition operations that were performed within the VMS of FIG. 1-4 are instead performed within the cameras. That is, the cameras send streams of meta data that include the facial recognition information to the verification and tracking system 156 for analysis.

The verification and tracking system 156 also maintains caches of both the user credentials and the facial recognition information, and stores these caches to user accounts 93 at the verification and tracking system 156 for each of the individuals.

The camera 103 includes a facial recognition module 107. The verification and tracking system 156 includes user accounts 93 of users 60 and rules 129. Each user account 93 includes user credentials 172 of authorized users and facial recognition information 171 of authorized users (e.g. biometric facial pattern).

When users 60 are authorized by the verification and tracking system 156 of the access control system 128, the verification and tracking system 156 sends a signal over the local network 210 to the door controller 112. The signal unlocks the door 149, and the users turn door handle 145 of the door 149 to obtain access to the restricted areas.

The camera 103 captures image data 99 of a scene within a field of view 104 of the camera 103. The camera 103 also determines facial metadata 250 from the image data 99.

In the illustrated example, two users 60A and 60B approach and enter a threshold area 131 near the access point 149. The users 60 are either authorized, unauthorized, or unidentified users. Users 60A and 60B approach and then enter the threshold area 131 to obtain access. When the users 60 are near or within the threshold area 131, the users are within the field of view 104 and are thus captured within the image data 99.

The facial recognition module 107 of the camera 103 analyses the image data 99 to obtain the facial recognition information of the users. The facial recognition module 107 also includes a list of facial recognition information of authorized users periodically downloaded from the verification and tracking system 156. In one example, the facial recognition information in the list includes a facial recognition pattern or template that uniquely identifies each authorized user. The facial recognition module 107 analyzes the image data 109 to obtain facial recognition information of each user 60, and determines whether each user is authorized based upon the facial recognition information, in one example.

The facial recognition module 107 includes a list of identified and authorized faces, a list of unidentified faces, and a list of identified but unauthorized faces. The facial recognition module 107 also determines whether each user is authorized based upon the facial information by comparing the obtained facial information against the lists.

The facial recognition module 107 provides a stream of facial metadata 250 in response to the analysis. The metadata 250 includes the list of identified and authorized faces, the list of unidentified faces, and the list of identified but unauthorized faces, in examples. The metadata 250 also includes spatial position information of the faces of the users 60 within the image data 99.

The metadata 250 also includes an identity of the user 60 (identified from their face) and user-specific metadata information associated with the person. Typically, the user-specific metadata includes information such as an age, gender, smile, facial hair, head pose, emotion (e.g. anger, contempt, disgust, fear, happiness, neutral, sadness, surprise), glasses, hair (visible, bald etc.), makeup, accessory (headwear, mask etc.), occlusion (e.g. whether the face area is obscured by a hat, motorcycle helmet, balaclava) and blur level, in examples.

The verification and tracking system 156 receives and monitors the stream of metadata 250 sent from the camera 103. The verification and tracking system 156 then extracts and analyzes the contents of the metadata 250 to determine whether tailgating occurs at the access point 149. The verification and tracking system 156 analyzes the contents of the metadata 250 (such as the identification information and the spatial information) to handle different tailgating scenarios.

In a first tailgating scenario, user 60A is an authorized user that is followed closely by another authorized person 60B. The verification and tracking system 156 determines that user 60B is an authorized user from the metadata 250 and sends the unlock signal to the door controller 112 to enables both users 60A and 60B to obtain access.

In a second tailgating scenario, user 60A is an authorized user that is followed closely by an unauthorized person 60B. The verification and tracking system 156 determines that user 60B is an unauthorized user from the metadata 250. As a result, the access control system 128 denies access to both users 60A/60B.

In a third tailgating scenario, user 60A is an authorized user that is followed closely by an unidentified person 60B. The verification and tracking system 156 determines that user 60B is an unidentified user from the metadata 250. As a result, the access control system 128 denies access to both users 60A/60B.

In addition, the verification and tracking system 156 includes rules 129. Security personnel can use the rules 129 to modify and/or place conditions upon the access granting decision process executed by the verification and tracking system 156. For example, a rule may be set that allows the access control system 128 to maintain the door locks on an open state while an authorized user 60 is present at the door. This might be useful in a school environment where keeping the door open while a teacher is present may be desirable, in one example.

Figure 7:
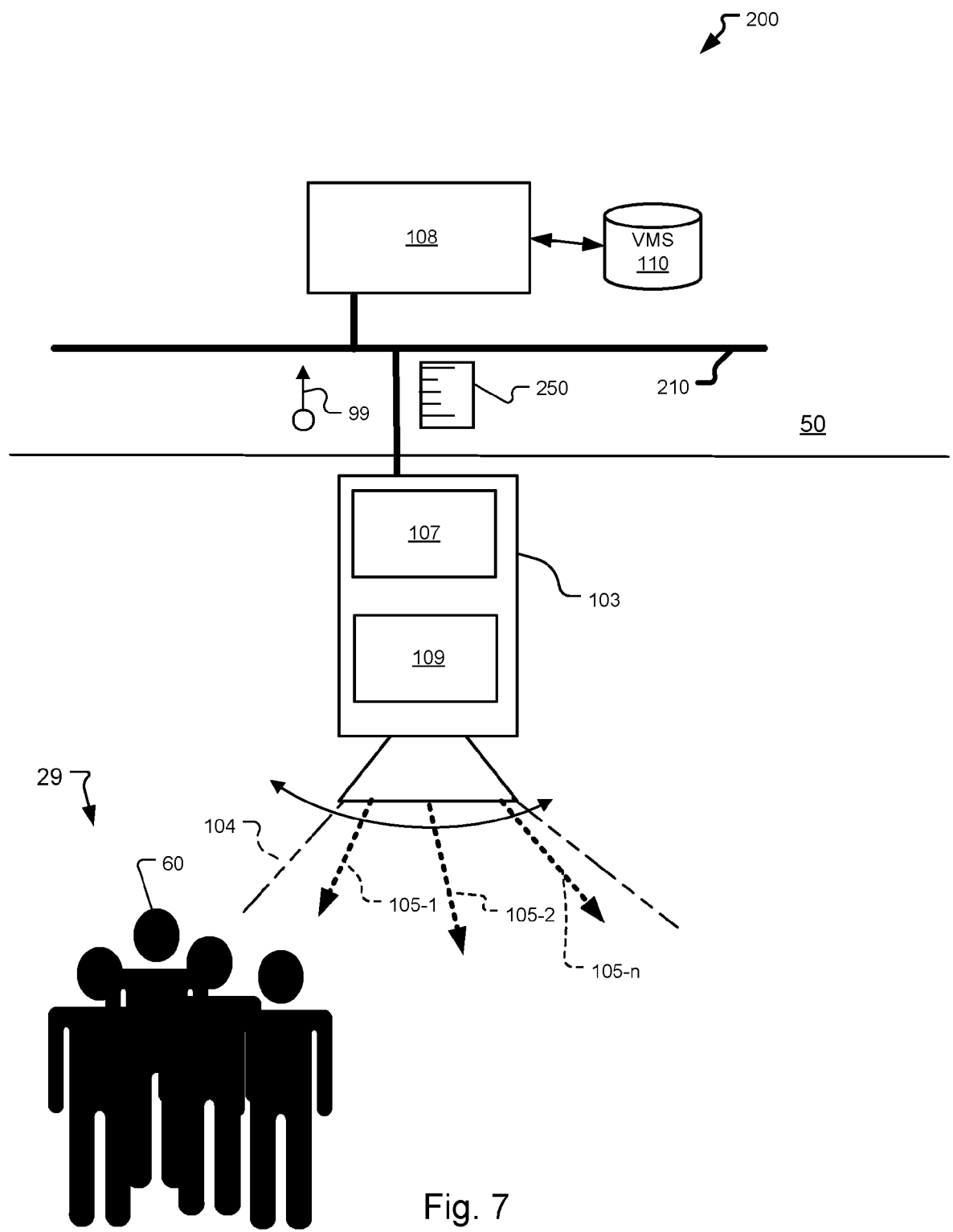
FIG. 7 is a block diagram showing a security system installed at a building, where a PTZ camera of the system is mounted to an exterior of the building and monitors areas around the building, and where the camera obtains facial recognition information of individuals in the areas and uses the information to automatically point the camera.

FIG. 7 illustrates a security system 200. The security system 200 obtains facial information of individuals 60 and utilizes this information to provide an intelligent guard tour capability.

The security system 200 includes a PTZ surveillance camera 103 mounted to an exterior of a building 50. Within the building 50, the system 200 includes a system controller 108 and the video management system 110. The camera 103 and the system controller 108 communicate over local network 210.

In this example, facial recognition and face counting are performed within the cameras, and the cameras send streams of meta data that include the facial recognition information and the face count to the system controller 108 for analysis.

The system controller 108 also maintains caches of both the user credentials and the facial recognition information.

One or more cameras 103 capture a series of images as image data 99. Alternatively, the cameras 103 may capture a series images at predefined intervals (e.g., once every 30 seconds). In a preferred embodiment, the cameras 103 use a motorized or scanning positioning system such as pan-tilt or pan-tilt-zoom (PTZ) systems. The cameras 130 also analyze the image data 99 to obtain facial metadata 250 of the individuals.

In a typical implementation, the camera 103 or the controller 108 store set points, which are preset positions of the lens or the camera 103 defined as the triple of a pan angle, a tilt angle, and a zoom level that correspond to different fields of view. In the illustrated example, these set points are shown as arrows 105-1 to 105-n. The system controller 108 directs the camera 103 to move its field of view 104 to the set points, and the camera tracks objects of interest at each set point as part of a guard tour.

Each PTZ camera 103 includes a facial recognition module 107 and a face counting system 109. During a normal intelligent guard tour, the camera 103 will cycle through its pre-defined positions, processing real-time face data as it moves. Specifically, the facial recognition module 107 obtains facial recognition information of individuals from the image data 99, and the face counting system 109 counts a number of faces from the facial recognition information. The camera 103 then produces facial metadata 250 that includes the time of day, the facial recognition information, and the face count of the individuals 60, in examples.

The system controller 108 receives the image data 99 and the metadata 250 over the local network 210 from the one or more cameras 103 and the NVR 110 stores (e.g. records) the image data 99 and the metadata 250.

In the illustrated example, a crowd 29 of individuals 60 gathers in an area outside the building 50. Based on the time of day and the metadata 250, such as the face count of the individuals, in one example, the system controller 108 and/or the camera 103 infers that the number of individuals in the crowd 29 is unusual for the time of day. Such a crowd 29 could indicate an emergency situation or indication of criminal activity, in examples.

Based on the metadata 250, the system controller 108 and/or the camera 103 can: configure the number of faces that will be considered to be a crowd; determine whether masked faces should be monitored; and determine whether faces showing emotion (e.g. anger) should be monitored, in examples. During these events, the system controller 108 will direct the camera 103 to temporarily depart from its normal scanning as part of the guard tour. The camera 103 points the field of view 104 to the crowd 29, and narrowly focus its field of view 104 to obtain "tight shots" of the area. In one example, the camera 103 focuses upon the smallest area of the scene that includes all of the faces of the individuals 60 in the crowd 29.

It is also important to note that the facial analytics guard tour could also be applied to a camera 103 that supports Digital PTZ (for example a Fish-eye camera—this would have the advantage of maintaining the full image whilst allowing the faces to be focused upon).

Figure 8:
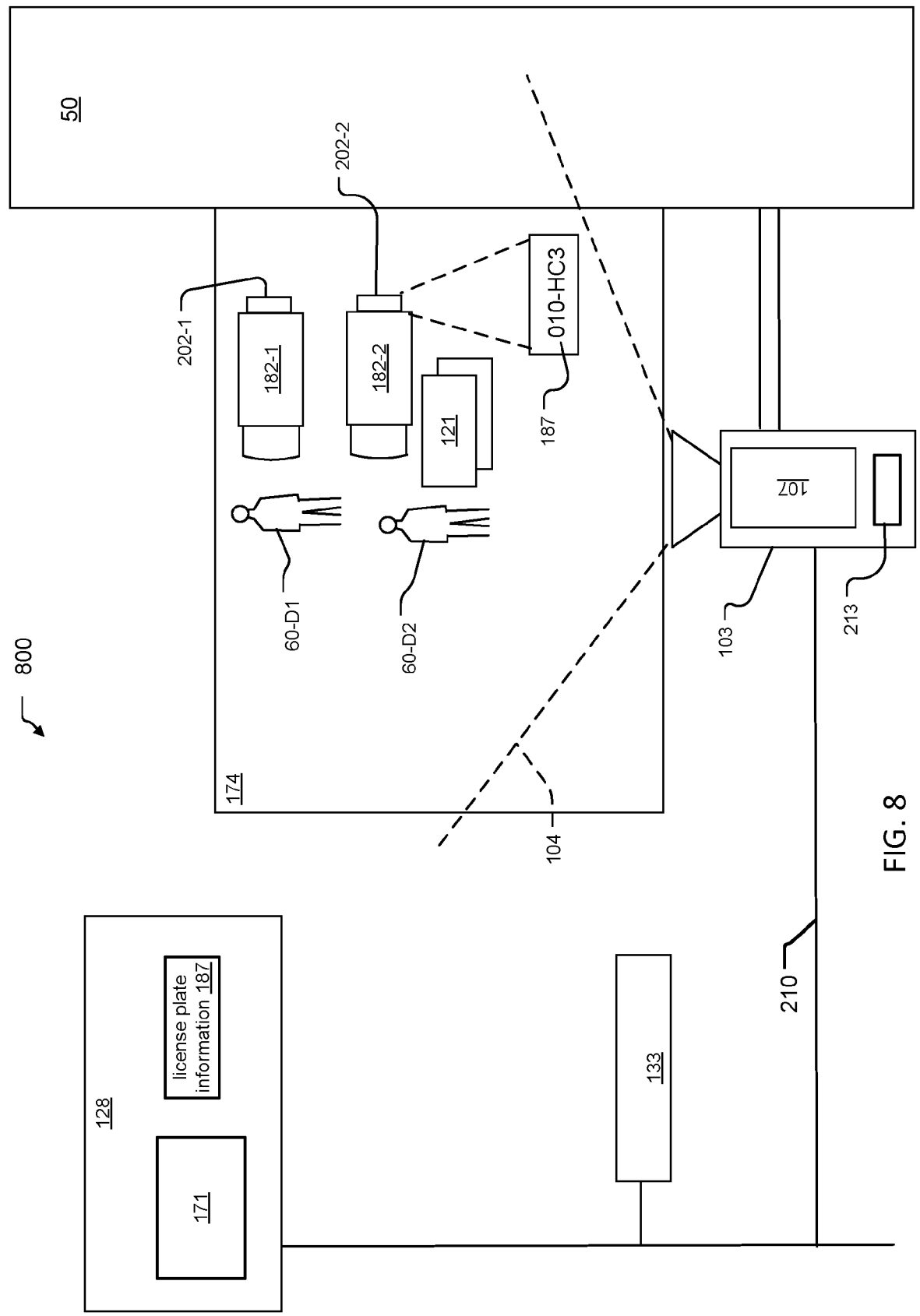
FIG. 8 shows a security system outside a building, where cameras at the building obtain facial recognition information of individuals and information concerning vehicles operated by the individuals at a loading dock of the building, to determine whether the individuals are allowed to deliver goods to the building.

FIG. 8 shows a security system 800 outside a building. The security system 800 includes a camera 103 mounted to a building 50 that monitors a loading dock 174, an access control system 128, and a scheduling system 133.

In this example, the video management system could be located within the access control system (ACS) 128. Facial recognition is performed within the cameras, and the cameras send streams of meta data that include the facial recognition information and the face count to the access control system 128 for analysis.

The access control system 128 also maintains caches of both the user credentials and the facial recognition information.

The camera 103 is mounted to the building 50 and includes a facial recognition module 107 and number plate recognition system 213. A loading dock 174 outside the building is included within a field of view 104 of the camera 103.

Vehicles 182 including goods 121 enter and leave the loading dock 174. Vehicles 182-1 and 182-2 are respectively operated by individuals 60-D1 and 60-D2. The vehicles 182-1 and 182 have a license plate 202-1 and 202-2, respectively. More detail for license plate 202-2 is shown. License plate information 187 of the license plate includes a number (e.g. 010-HC3 as shown), registration sticker, a state of registration, and the type of vehicle (e.g. semi-trailer), in examples.

The access control system 128 controls whether the vehicles 182 and drivers 60-D area able to obtain access to the building 50 for delivery of the goods 121. This access control system includes facial recognition information 171 for the driver 60-D of the vehicle and also the license plate information 118 of the vehicle.

The scheduling system 133 identifies the time interval that the delivery vehicle 182 and driver are allowed access to the building 50.

To obtain access to the building, the delivery van 182 will need to satisfy one or more the following criteria: it will need to arrive within the scheduled delivery time frame; it will need to have a license plate 202 that is registered with the access control system 128; and the driver 60-D will need to be recognized by the facial recognition module 107. Otherwise, the vehicle 182 will not be allowed access to the building to deliver the goods 121. When the one or more conditions are met, the driver 60-D can deliver the goods 121 without requiring that other individuals be at the building to receive the goods, for example.

The access control system 128 can also automatically recognize and confirm that both the vehicle 182 and its driver 60-D are authorized before allowing the driver 60-D to enter the vehicle 182. This safeguards against unauthorized drivers 60-D that might otherwise steal vehicles 182 and the goods 121 within the vehicles 182 at the loading dock 174. Moreover, the access control system can determine whether there more is than one person in the vehicle 182 and allow or deny access to the building based upon the determination. The access control system 128 also determines whether vehicles 182 are present at particular locations at particular times.

In yet another example, the access control system 128 can allow or deny access to a delivery person 60-D based upon the presence and/or number of individuals at the building 50 that are waiting to receive the goods 121. In still another example, the access control system 128 monitors the direction of goods 121 in and out of the loading dock 174, and raises alarms and disables access to the building 50 upon determining that the goods 121 are moving in the wrong direction.

It can also be appreciated that the security system is applicable to delivery of goods at residences of individuals, such as individual homes or apartments within apartment buildings. Such a system provides a measure of access control for otherwise unsupervised entry of a delivery person 60-D into a person's home.

Figure 9:
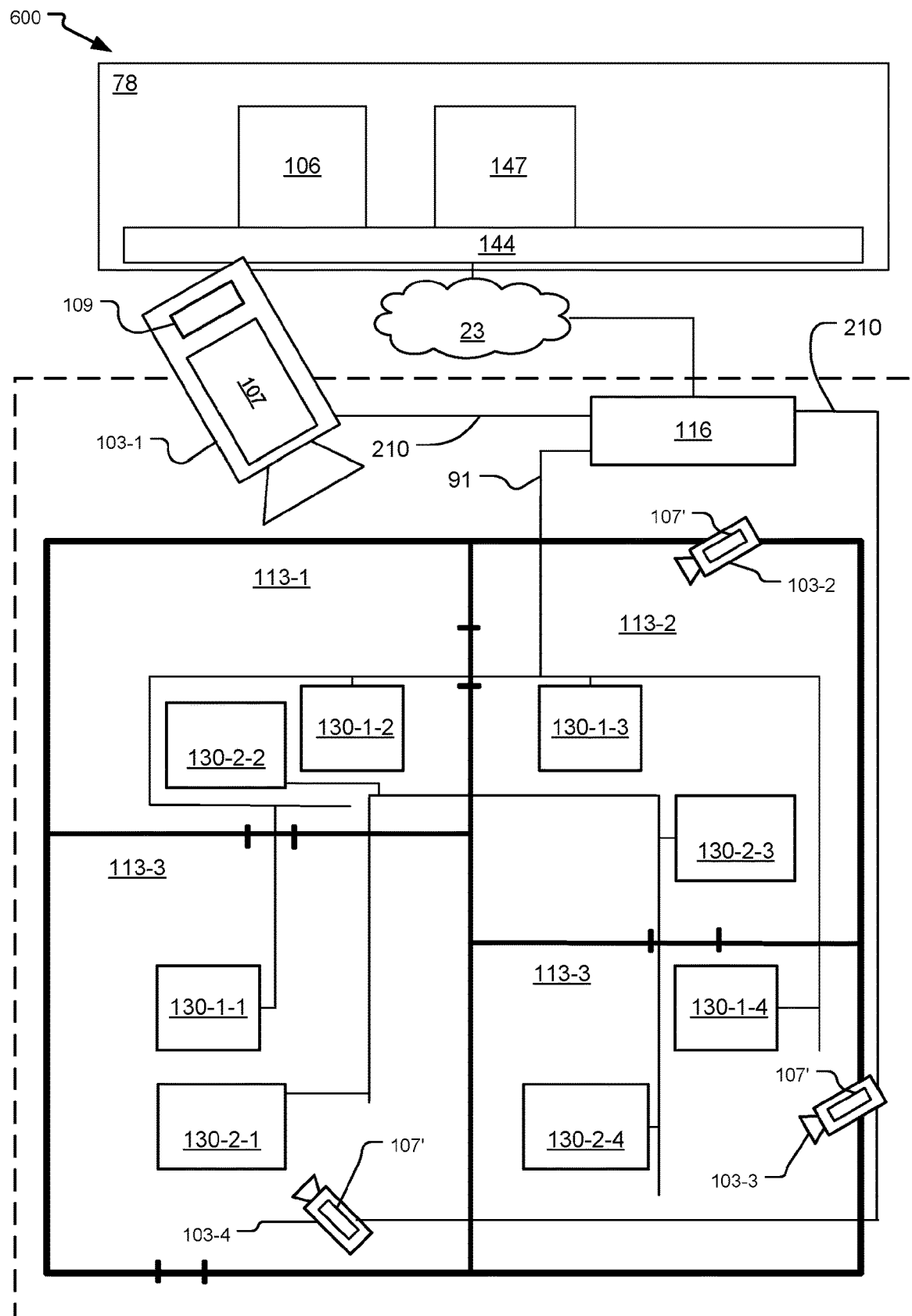
FIG. 9 is an HVAC system at building that uses facial count information of individuals to determine whether to control thermostats within the building.

FIG. 9 shows an HVAC system 600 for a building 50.

Companies are under increasing pressure to make optimal use of energy within buildings. This includes the use of heating, ventilation and air-conditioning units (HVAC). Traditional methods of controlling heating and ventilation rely on using timed events or manual control to achieve the desired environmental conditions. This can result in wasted energy.

Each office/room 113 is equipped with a camera 103 that includes a facial recognition module 107 and a face counting system 109. Alternatively, these systems are included within a common facial recognition module 107'. The camera 103 is connected to a control system such as an HVAC system control panel 116 via a local network 210. The HVAC system controls temperature devices 130 in each room 113.

Temperature devices 130 communicate over a device loop 91 with the HVAC system control panel 116. The temperature devices include thermostats and heat detectors, in examples. Room1 113-1 includes thermostat 130-2-2, heat detector 130-1-2, and is monitored by camera 103-1. Camera 103-1 includes a facial recognition module 107 and a face counting system 109.

The HVAC system 600 also includes a connected services system 78. The connected services system 78 includes a connected services server system 144, a connected services database 106, and a temperature detector evaluation module 147. The database 106 and the temperature detector evaluation module 147 are software modules that execute on top of the connected services server system 144.

In this example, the video management system could be located within the connected services system 78. Facial recognition is performed within the cameras, and the cameras send streams of meta data that include the facial recognition information and the face count to the control panel 116 for analysis.

The connected services database 106 also maintains caches of both the user credentials and the facial recognition information.

The connected services server system 144 receives information from various connected systems typically via a public network 23, which is a wide area network such as the interne, and stores the information in the connected services database 106. The control panel 116 communicates with the connected services system 78 over the public network 23. The connected services system 78 receives information reported and transmitted from the control panel 116.

Room2 113-2 includes thermostat 130-2-3, heat detector 130-1-3, and is monitored by camera 103-2. Camera 103-2 includes a common facial recognition module 107'.

Room3 113-3 includes thermostat 130-2-4, heat detector 130-1-4, and is monitored by camera 103-3. Camera 103-3 includes a common facial recognition module 107'.

Room4 113-4 includes thermostat 130-2-1, heat detector 130-1-1, and is monitored by camera 103-4. Camera 103-4 includes a common facial recognition module 107'.

The control panel 116 receives facial identification information and face counting information obtained by and sent from each of the cameras 103. In one implementation, the control panel 116 sends a temperature level to the thermostats based upon the face account information for each room 113. As a result, the control panel 116 provides adaptive climate control by adjusting the temperature in the building 50 based upon facial recognition information and/or face count information.

Figure 10:
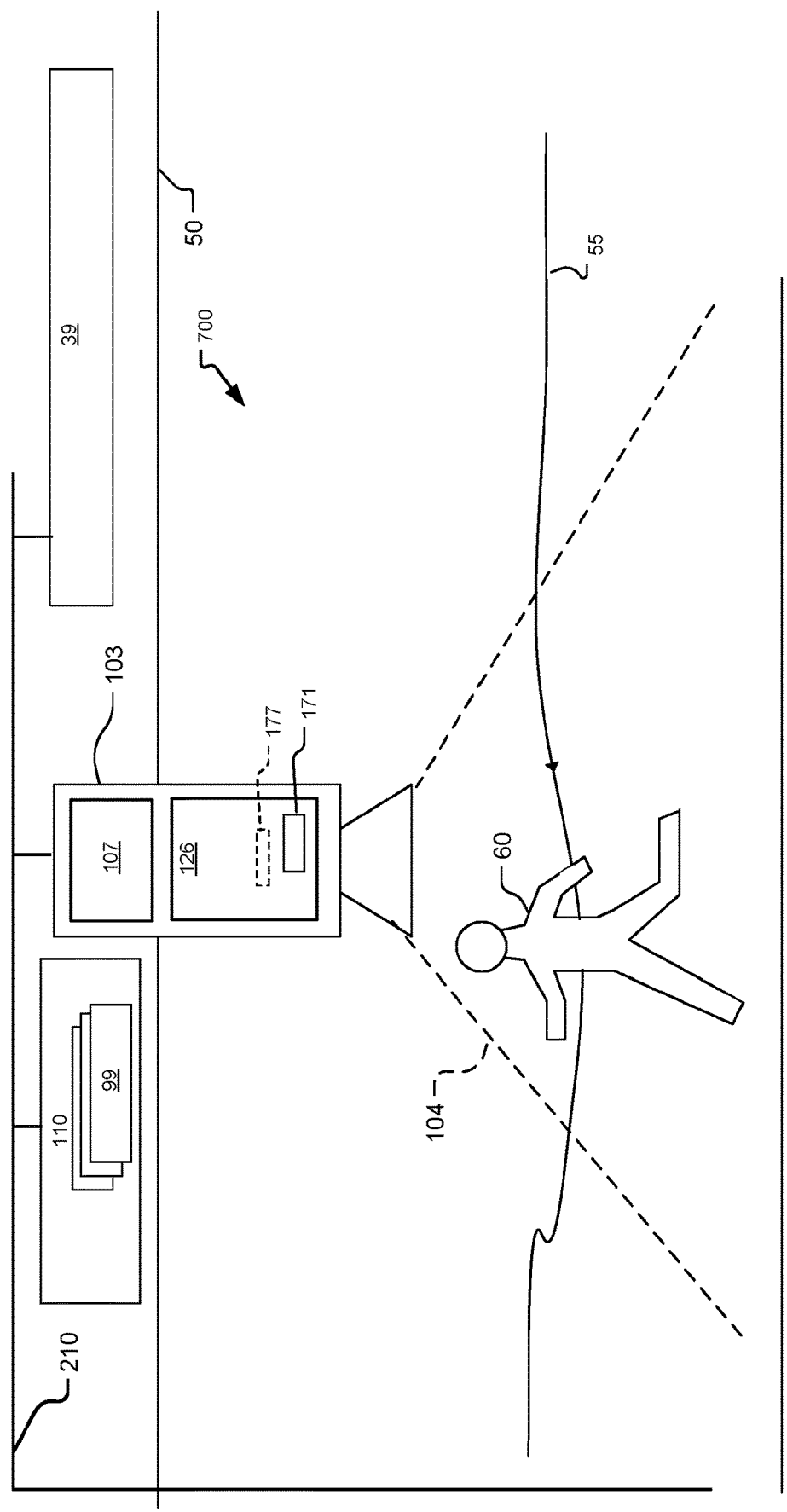
FIG. 10 is a security system that infers whether individuals are unexpectedly running within a building, based upon cameras of the system that obtain facial recognition information of the users as they are running.

FIG. 10 shows a security system 700 at a building 50. The system uses facial recognition information of individuals to infer emergency situations, such as an individual unexpectedly running within the building 50.

The system 700 includes at least one camera 103, a video management system (VMS) 110, and an analysis system 39 that communicate over a local network 210. The camera 103 includes a facial recognition module 107 and a local database 126. The camera 103 captures image data 99 of a scene and stores the image data 99 over the local network 210 to the VMS 110.

In this example, facial recognition is performed within the cameras, and the cameras report to the analysis system 39.

It is difficult to determine from a video image that people are running. This can be useful in dangerous situations in public spaces where people will tend to run away from danger. In the illustrated example, a person 60 is running through an area of the building 50 and traverses a path 55 within the area.

To detect such a situation, the camera 103 obtains facial recognition information 171 from the image data 99. The recognition does not have to be sophisticated in that it does not need to identify a person's face. It only needs to be able to identify if a face is identical to another face that has been captured earlier.

The camera 103 uses the facial recognition information 171 to track an individual's movement through an image 99. The camera 103 accomplishes this objective by: detecting the faces in a stream of the image 99, the detection also including the location of the face 177 within the image; maintaining a local database 126 of the faces (e.g. the facial recognition information 171 of each face) currently in an image 99; and comparing the facial recognition information found in a new image 99 with that found in the previous image 99.

If a new face is found, the camera 103 adds the facial recognition information 171 for the face to its local database 126, along with the facial location information 177 in the image data 99. If a face exists in the database, but is no longer found in the image data 99, the camera 103 removes the image 99 from the local database.

If a face already exists in the database 126, the camera 103 compares its new location information 177 with the existing location information 177 in the database. This will allow a motion vector to be computed for the face. This motion vector will determine the direction and speed that the face (and therefore the speed of the individual) is moving.

The camera will be configured with metadata relating to the image perspective. This will be configured manually, in one example. Based on the perspective and motion vector information it will be possible to compute the speed at which faces are transitioning through the image.

The camera 103 also has the ability to set a threshold speed above which a person will be considered to be running.

The camera generates metadata that generates the individual motion vectors for each of the faces in the image 99, processes all of the motion data, and provides a collective speed and direction for all of the faces in the image.

The algorithm could be made smarter by using emotion information on the faces to identify fear (for example in terror situations), using age information to tailor the threshold at which someone could be considered to be running (older people will run more slowly).

The analysis system 39 also receives the facial recognition information 171 and location information 177 from multiple cameras 103 located in different places of the building 50. The analysis system 39 knows the exact location of each of the cameras 103. The analysis system then uses the movement metadata across multiple cameras 103 to triangulate where a possible dangerous situation has occurred.

FIG. 11 shows a portion of a safe city system 900. The system 900 includes cameras 103 that monitor individuals at a jobsite and an analytics tracking system 302.

In this example, the video management system could be located within the analytics tracking system 302. Facial recognition is performed within the cameras, and the cameras send streams of meta data that include the facial recognition information and the face count to the analytics tracking system 302 for analysis.

The tracking system 302 also maintains caches of both the user credentials and the facial recognition information.

The cameras 103-1 and 103-2 of the system 900 monitor individuals 60 at a construction site. Individual 60-L, a lone worker in a trench 230, is supervised by supervisor individual 60-S. Individual 60-O, an operator, is operating a backhoe 204 at the site. The backhoe 204 has a license plate 202.

In some countries, there are legal requirements concerning the provision of a safe environment for lone workers 60-L. Currently these requirements are met by requiring the lone worker to contact their line manager/supervisor 60-S at regular intervals either by text message or phone call. These methods are not fool proof, however.

The backhoe operator 60-O, the supervisor 60-S, and the license plate 202 are within the field of view 104-1 of camera 103-1. The lone worker 60-L is within the field of view 104-2 of camera 103-2.

The cameras 103 communicate over a local network 210 and connect to a public network 23. The public network 23, in turn, communicates with the analytics tracking system 302.

The cameras 103 are equipped with face detection, face recognition and license plate recognition systems throughout the urban environment where the lone worker operates. Only a facial recognition module 107 of the cameras 103 is shown.

The analytics tracking system 302 is an integrated (mesh-based) tracking system that monitors the movements of the loan worker 60-L and possibly other individuals.

The tracking system 302 registers the following information for the lone worker 60-L:

Their face (for use with face recognition).
The license plate of their vehicle if they have one.
Their route for the day (including approximate times for traversing the route, for example the times for specific appointments at specific locations).

The tracking system 302 maintains a database of all of the cameras 103 in the urban environment and their locations. Given a lone worker's route and the appointment times, the tracking system 302 will identify which cameras 103 the worker 60-L will pass, how the loner worker 60-L will pass the cameras 103 (on foot, in a vehicle) and estimate when the workers 60-L will pass the cameras 103.

The tracking system 302 also monitor the cameras 103 for the duration of the lone worker's day. The tracking system 302 alerts the lone worker's manager/supervisor 60-S if the loan worker 60-L fails to pass the cameras 103 on the designated route at the designated time (within a configured tolerance). If the loan worker 60-L fails to pass the cameras 103, the tracking system 302 also activates a deadman switch on the jobsite that cuts power to equipment at the jobsite.

In addition, the tracking system 302 monitors the appearance of the lone worker (or their vehicle) in cameras outside of the designated route and alerts the lone worker's manager 60-O if this happens.

In another implementation, the tracking system 302 also takes into account traffic conditions and weather conditions (lighting etc.) and real-time delays in the lone worker's progress. The tracking system 302 takes into account this information when calculating the best method for monitoring the lone worker's route and the timing of the appearance of the lone worker 60-L in the various cameras.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system, comprising:
at least one processor configured to:
perform facial recognition for a face of an individual in image information captured by one or more surveillance cameras at least in part by comparing the face in the image information to identified facial signatures stored in one or more databases to determine an identification of the individual;
analyze the image information to determine tracking metadata, the tracking metadata including the identification of the individual as performed by the facial recognition, a current location of the individual, and an activity performed by the individual at the current location;
obtain, from an enterprise resource planning (ERP) system, a rule stored for the individual and corresponding to the current location, the rule requiring a condition be satisfied during the activity for compliance with the rule, wherein the condition relates to a ratio of employees to non-employees present outside of an area before or during the activity;
determine the compliance or non-compliance with the rule based on the tracking metadata by at least determining whether the condition is satisfied during the activity; and
send, over a network and in response to determining the compliance or non-compliance with the rule, a control message, wherein the control message is configured to implement an access control function at an access control system.

2. The system of claim 1, wherein to identify the rule, the at least one processor is further configured to:
retrieve an employee job description associated with the individual from an employee resource management system that maintains an employee database; and
identify the rule based at least in part on the employee job description.

3. The system of claim 1, wherein the rule governs a ratio of employees to supervisors, and to determine the compliance or non-compliance with the rule is based on the tracking metadata, the at least one processor is further configured to determine compliance with the ratio based on the current location of the individual.

4. The system of claim 1, wherein the non-employees are prisoners.

5. The system of claim 1, wherein the rule corresponds to an operation schedule, and wherein the at least one processor is configured to determine the compliance or non-compliance with the rule based on whether the activity, the current location, and a time of day associated with the image information corresponds to the operation schedule.

6. The system of claim 5, wherein the at least one processor is further configured to retrieve the rule and the operations schedule from an enterprise resource planning system containing a plurality of rules and operations schedules databases.

7. The system of claim 1, wherein the at least one processor is configured to perform the control function in response to the control message.

8. The system of claim 1, wherein the at least one processor is configured to generate an alarm by a notification device in response to the control message.

9. The system of claim 1, wherein the at least one processor is configured to unlock an access point or maintain a locked state of the access point in response to the control message.

10. The system of claim 1, wherein the at least one processor is configured to prevent a process or equipment from functioning in response to the control message.

11. The system of claim 1, wherein the at least one processor is configured to provide, via a heating, ventilation, and air-conditioning unit, adaptive climate control in response to the control message based on non-compliance with the rule.

12. A method, comprising:
performing facial recognition for a face of an individual in image information captured by one or more surveillance cameras at least in part by comparing the face in the image information to identified facial signatures stored in one or more databases to determine an identification of the individual;
analyzing the image information to determine tracking metadata, the tracking metadata including the identification of the individual as performed by the facial recognition, a current location of the individual, and an activity performed by the individual at the current location;
obtaining, from an enterprise resource planning (ERP) system, a rule stored for the individual and corresponding to the current location, the rule requiring a condition be satisfied during performance of an action;
determining compliance or non-compliance with the rule based on the tracking metadata by at least determining whether the condition is satisfied during the activity for compliance with the rule, wherein the condition relates to a ratio of employees to non-employees present outside of an area before or during the activity; and
sending, over a network and in response to determining the compliance or non-compliance with the rule, a control message, wherein the control message is configured to implement an access control function at te-an access control system.

13. The method of claim 12, wherein the rule governs a ratio of employees to supervisors, and the method further comprises determining compliance with the ratio based on the current location of the individual.

14. The method of claim 12, wherein the non-employees are prisoners.

15. The method of claim 12, wherein the rule corresponds to an operation schedule, and wherein determining the compliance or non-compliance with the rule is based on whether the activity, the current location, and a time of day associated with the image information corresponds to the operation schedule.

16. The method of claim 15, further comprising retrieving the rule and the operations schedule from an employee resource management system.

17. The method of claim 12, further comprising:
retrieving an employee job description associated with the individual from an employee resource management system that maintains an employee database; and
identifying the rule based at least in part on the employee job description.

18. A non-transitory computer-readable device having instructions thereon that, when executed by at least one computing device, causes the at least one computing device to perform operations comprising:
performing facial recognition for a face of an individual in image information captured by one or more surveillance cameras at least in part by comparing the face in the image information to identified facial signatures stored in one or more databases to determine an identification of the individual;
analyzing the image information to determine tracking metadata, the tracking metadata including the identification of the individual as performed by the facial recognition, a current location of the individual, and an activity performed by the individual at the current location;
obtaining, from an enterprise resource planning (ERP) system, a rule stored for the individual and corresponding to the current location, the rule requiring a condition be satisfied during performance of an action;
determining compliance or non-compliance with the rule based on the tracking metadata by at least determining whether the condition is satisfied during the activity for compliance with the rule, wherein the condition relates to a ratio of employees to non-employees present outside of an area before or during the activity; and
sending, over a network and in response to determining the compliance or non-compliance with the rule, a control message, wherein the control message is configured to implement an access control function at to an access control system.

19. The non-transitory computer-readable device of claim 18, further comprising at least one of:
wherein the rule governs a ratio of employees to supervisors, and determining the compliance or non-compliance comprises determining compliance with the ratio based on the current location of the individual; or
wherein the rule governs a number of employees to non-employees, and determining the compliance or non-compliance comprises determining compliance with the number of employees to non-employees based on the current location of the individual; or
wherein the rule governs a number of employees that must be present for specified operations, and determining the compliance or non-compliance comprises determining compliance with the number of employees based on the current location of the individual.

20. The non-transitory computer-readable device of claim 18, wherein the rule corresponds to an operation schedule, and wherein the operations further comprise determining the compliance or non-compliance with the rule based on whether the activity, the current location, and a time of day associated with the image information corresponds to the operation schedule.

21. The non-transitory computer-readable device of claim 20, wherein the operations further comprise retrieving the rule and the operations schedule from an employee resource management system.

22. A system, comprising:
   at least one processor configured to:
      perform, for multiple faces in one or more images captured by one or more surveillance cameras of a location outside of an area, facial recognition including counting a number of the multiple faces in the one or more images and comparing each of the multiple faces in the one or more images to identified facial signatures stored in one or more databases to determine an identification of one or more individuals;
      obtain, from an employee resource management (ERM) system, an indication of whether the identification of the one or more individuals matches an employee profile in the ERM system;
      obtain, from an enterprise resource planning (ERP) system, a rule stored for the identification of at least one individual of the one or more individuals corresponding to the location, the rule requiring a threshold ratio of employees to non-employees present at the location outside of the area before or during an activity;
      determine a ratio of a number of the one or more individuals having the employee profile in the ERM system to the number of the multiple faces counted in the one or more images;
      determine compliance or non-compliance with the rule based on comparing the ratio to the threshold ratio; and
      send, over a network and in response to determining the compliance or non-compliance with the rule, a control message, wherein the control message is configured to implement an access control function at te-an access control system.

* * * * *